United States Patent [19]
Schneyer et al.

[11] Patent Number: 5,388,150
[45] Date of Patent: Feb. 7, 1995

[54] AUTOMATIC INCOMING TELEPHONE CALL IDENTIFICATION AND DISPOSITION SYSTEM

[76] Inventors: Robin Schneyer, 3470 Brookdale Dr., Santa Clara, Calif. 95051; Jing L. Gu, 1806 Yosemite Dr., Milpitas, Calif. 95035

[21] Appl. No.: 920,887

[22] Filed: Jul. 28, 1992

[51] Int. Cl.6 .................... H04M 1/57; H04M 3/02; H04J 3/12
[52] U.S. Cl. .................... 379/67; 379/88; 379/89; 379/142; 379/196; 379/245; 379/374
[58] Field of Search .............. 379/67, 88, 89, 127, 379/142, 196, 245, 374

[56] References Cited
U.S. PATENT DOCUMENTS

| | | | |
|---|---|---|---|
| 4,304,968 | 12/1981 | Klausner et al. | 179/6.02 |
| 4,608,460 | 8/1986 | Carter et al. | 179/6.11 |
| 4,860,339 | 8/1989 | D'Agosto, III et al. | 379/355 |
| 4,866,762 | 9/1989 | Pintar | 379/200 |
| 4,924,496 | 5/1990 | Figa et al. | 379/142 |
| 4,975,943 | 12/1990 | Weber et al. | 379/200 |
| 5,200,994 | 4/1993 | Sasano et al. | 379/375 |

OTHER PUBLICATIONS

Advertisement for "Friends Only"; Home Automation Laboratories Mail Order Catalog; Fall/Winter 1991.

*Primary Examiner*—James L. Dwyer
*Assistant Examiner*—Fan Tsang
*Attorney, Agent, or Firm*—Thomas C. Feix

[57] ABSTRACT

An automatic incoming telephone call identification and disposition system embodied in a telephone receiver console which includes a database directory of telephone numbers and disposition calendars which contain activity information relating to one of several caller response options for each incoming telephone caller depending on the time and date that the call is received. Call dispositions of the system include: telephone ring; ring suppress; and connection to an answering machine or fax. The system also includes circuitry for monitoring incoming calls, circuitry for automatic number identification detection of an incoming call, circuitry for after answer code detection, and user programmable system control means and software for coordinating the operation of the system components. The system is also provided with an LCD display for user viewing of an identified caller's number prior to picking up the telephone receiver and an audible recipient alert function capability for signalling a desired incoming caller in one of a variety of audible announcements at either a local or remote site(s).

19 Claims, 18 Drawing Sheets

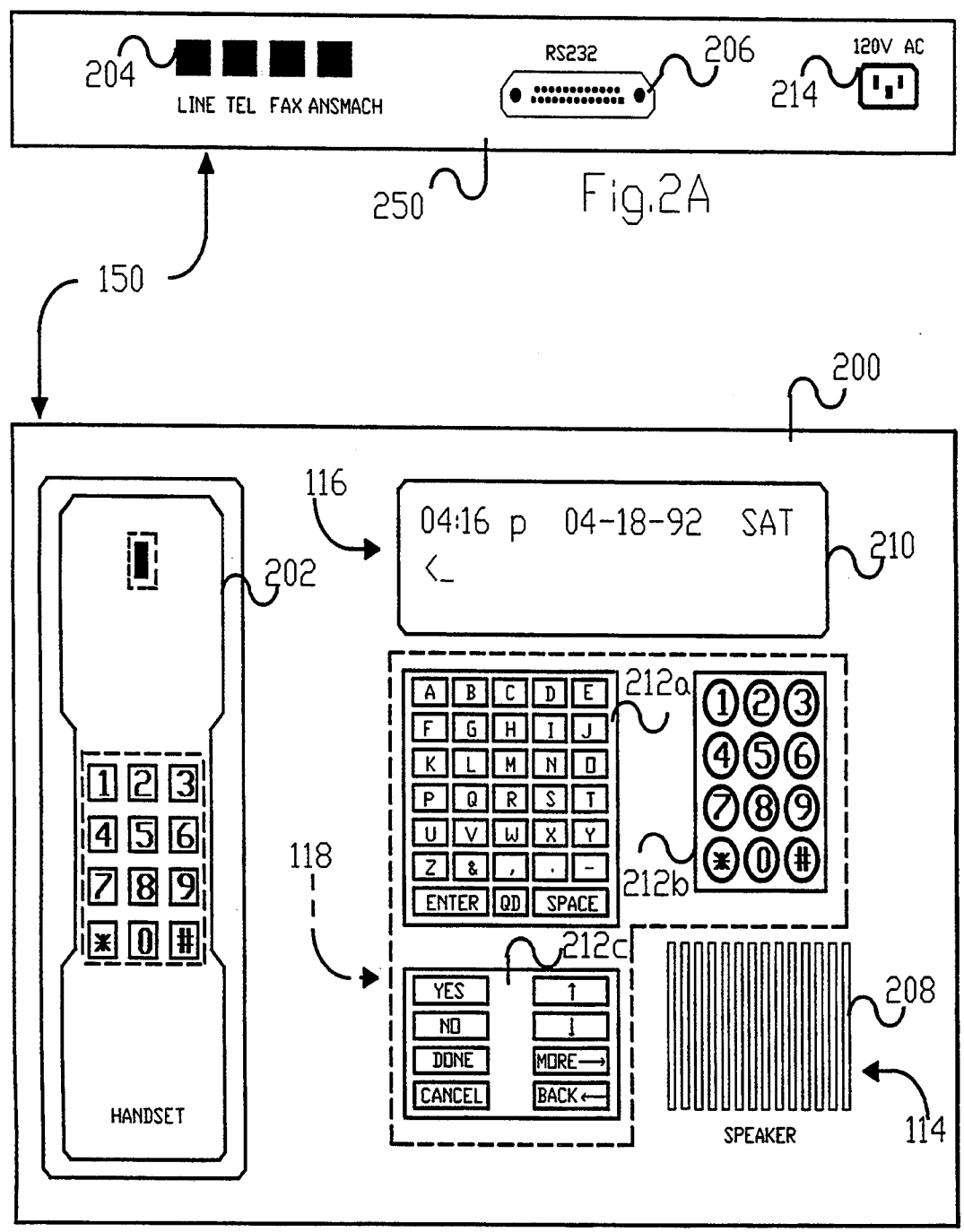

AUTOMATIC INCOMING TELEPHONE CALL IDENTIFICATION AND DISPOSITION SYSTEM

BACKGROUND OF THE INVENTION

1. Field of the Invention

This invention relates to caller identification and disposition systems for telephones, and more particularly to such a system that identifies calling parties and disposes of the calls via an internal database of recognized callers and calendar of dispositions.

2. Brief Description of the Prior Art

A variety of telephone call identification systems are available for displaying the identification of an incoming caller, either by name or by telephone number. One approach to caller identification is achieved by a telephone call identification system, such as the exemplary display system disclosed in U.S. Pat. No. 4,924,496 issued May 12, 1988 to Figa et al., which uses a special service provided by the telephone company commonly known as the Automatic Number Identification (ANI) service to passively identify the caller during the ring cycle. In Figa's system, the telephone number of the caller is compared to telephone numbers stored on an internal directory. Similar systems will also display a caller's name from the information sent with the ANI service in the case where the telephone company's service also includes transmission of the caller's name. There are several disadvantages associated with these incoming telephone call identification systems. Firstly, these systems require that the caller be using a telephone within a specified ANI calling region. Also, the calling telephone's number must be recognized by the recipient in order to properly identify the caller. Finally, these systems require that the recipient should also be a subscriber to the ANI service. This is problematic since the ANI service is not yet offered in all localities.

Another approach to caller identification is achieved by a device such as that disclosed in U.S. Pat. No. 4,304,968 issued Dec. 8, 1981 to Klausner et al. Klausner's device first establishes a speaking connection between the calling and receiving telephone, and then requires that the caller enter special information which, in this case, again is evaluated through an internal database. A drawback associated with this device is that the caller must respond with special information, and must pay for the call if it is a toll call, whether or not the called party comes to the phone.

Several other similar devices, almost all using the second caller identification approach described above, can suppress the audible telephone ring when certain conditions of identification are not met. One such device currently marketed by Home Automation Laboratories of Atlanta, Georgia is called "Friends Only TM". The "Friends Only." device will alert the recipient to a call only when the caller has responded with the correct, current, three digit code which identifies the caller as a "friend". Drawbacks associated with this device include: (1) the caller identification capability is limited only to "friends" such that anyone who is not a "friend" cannot summon the recipient under any conditions; and (2) if the code becomes exposed such that the code must be changed, all callers who are to be handled as "friends" must be notified of the code change.

Another device called the "Call-Screening Caller Identifier TM" which is currently marketed by the catalog sales firm Hammacher Schlemmer, requires that the caller respond with his or her own telephone number. The recipient is then alerted only if the number matches a known number stored internally on a "priority" list, otherwise the number is stored for later review. Although this product allows more accurate identification, it still limits its response to "friend" (ring telephone) or "foe" (suppress ring and remember number).

Several drawbacks of all the existing active single-line technology telephone call identification devices and systems can be seen upon analysis of how the telephone is used in the typical private domicile. For example, in a large domicile having multiple extension telephones, identification and/or ring suppression is only available at the primary identifying unit. Thus the user must either purchase multiple units for each secondary extension telephone, each of which would need to be individually programmed, or run to the phone having the identification unit before deciding to accept any particular call. Real life human relationships are more complex than simply "friend or foe" and callers who might be unwelcome at one time of day can be very welcome at another time of day. For example, a user who operates a business from home may wish to accept all calls during business hours, but only acquaintance calls in the evening, and only close family calls during sleeping hours. Also, a desired caller disposition system should offer more options than a simple "ring" or "don't ring" response, especially since automatic answering machines and FAX machines have become widespread alternatives to speaking to a real person.

Accordingly there is a definite need for an incoming telephone call identification and disposition system which overcomes the problems and limitations of the prior art systems.

SUMMARY OF THE PRESENT INVENTION

It is therefore a principle object of the present invention to provide a telephone call identification and disposition system suitable for use in a typical home which suppresses telephone ringing and provides a display of the identification of an incoming telephone caller before voice communication is established and the call is answered. The identifying information displayed would preferably be the incoming caller's telephone number as transmitted by the telephone company, plus a name or other information taken from a database stored within the device or, if that is unavailable, a name transmitted by the telephone company if it is detected thus permitting caller identification via the Automatic Number Identification (ANI) service in those service regions provided by the telephone company.

It is a further object of this invention to provide telephone call identification and disposition system of the type described which further provides identification of an incoming caller after the device automatically answers the call in those circumstances where the user of this device has determined that further identification is required. This alleviates the drawback of identification systems which rely solely on the ANI service, and which are unable to recognize callers where ANI information is not available or has been lost, such as when the call originates outside the ANI region, or would be misleading, such as when the caller uses a public pay telephone.

It is a further object of this invention to provide a telephone call identification and disposition system of the type described which suppresses the audible ringing of the device and all telephone units attached to it until identification has been completed to the programmed satisfaction of the user. This allows a large range of possible responses to an incoming call.

It is a further object of this invention to provide a telephone call identification and disposition system of the type described which responds to an incoming call on the basis of options stored in an internal database. The desired options preferably include but are not limited to: noting the incoming call and its duration in an internal log; alerting the user; and connecting an automatic answering machine, FAX machine, or other piece of telephone equipment connected to the system via the provided tip and ring leads supplied by the telephone company to begin operation. A response for any single incoming call can include any one or more, or none of the above listed options, according to instructions programmed by the user. This provides the user a wide range of responses, rather than the limited "ring" or "no ring" responses provided by existing prior art screening systems.

It is a further object of this invention to provide a telephone call identification and disposition system of the type described which includes provision of a means for audible identification to the call recipient, in addition to or in place of a visual display means. When alerting the recipient is part of the response to a particular caller, the user shall be able to specify that the desired "alert" proceed in any one of a variety of special fashions in accordance with a technique sometimes referred to in the art as "priority ringing". This aids the recipient in identifying the caller or the priority of the call even when the recipient is not in a position to read the device's visual display.

It is a further object of this invention to provide a telephone call identification and disposition system of the type described with a means for alerting the recipient at a greater distance than the normal audible ring distance of a telephone. This allows bells or ring generators to be turned off in selected extension phones, so that undesired calls do not disturb certain users, but will still alert other persons/recipients in the vicinity of another non-selected extension phone when a desired call is present.

It is a further object of this invention to provide a telephone call identification system and disposition of the type described which offers a choice of responses to individual incoming calls on the basis of the time and date stamp of the incoming call in accordance with individual caller calendar information programmed by the user in the system's internal database. This allows a fine gradation of automated response to callers. For example, a particular caller may be programmed to alert the user during certain specified time periods, but will be shunted to an answering machine, or merely entered in the call log, or even entirely ignored at other time periods.

It is a further object of this invention to provide a telephone call identification system of the type described which includes an easy to use interface for creating and updating the necessary databases, and which permits searching for and use of data located in those databases and access to a call log for dialing outgoing calls as well as for identifying incoming calls.

The invention results from the realization that the ANI identification technique, though preferable to after-answer identification techniques, has inherent limitations which prevent complete identification of the caller in many circumstances, and that the most desirable system for the automated response to a caller should offer a wide range of responses which vary not only with the caller, but also with the time of day of the call. The invention results from the further realization that it should be a goal of the home telephone to be maximally flexible and minimally intrusive.

For this reason the system and device of the present invention incorporate a plurality of features including: a telephone receiver unit such as a speaker-phone, headset, or normal handset, to permit full functioning as a telephone without the need for other units; an integrated recording device for use as an answering machine; an integrated FAX receiver and printer; redial capability through a single key-press of the last number dialed; abbreviated number dialing number capability for often-dialed parties; a protocol recognition capability for responding to a similar device on the called party's line and for automatically downloading requested further identification information; automatic outgoing call redial capability when a busy signal is received and which continues redialing until the call succeeds; the ability to restrict the use of the unit and telephones connected to it on outgoing calls to selected area codes and prefixes; the ability to temporarily override the disposition of a calling party or class of calling parties as maintained in the internal databases; the ability to temporarily override a particular outgoing dialing restriction; the ability to protect the contents of the unit's databases from unauthorized change; the ability to display the local time of called or calling parties; the ability to update the device's own system clock from call information included with the calling number where ANI service is available; the ability to relate the device's information through recorded or simulated human voice as well as by displaying that information on a visual display unit.

The system also includes the ability to communicate the results of an identified call or the contents of its databases for logging to an external device such as a computer or another periodic automatic incoming telephone call identification and disposition unit, and to receive similar information from an external device, thereby allowing: (1) data to be saved, restored, and/or duplicated; (2) a larger database to be maintained than previously possible in the case of a database in the internal device memories alone; and (3) other activities to be undertaken by automated systems external to the device.

Other features and advantages of the invention will become apparent to those skilled in the art from the following detailed description and appended drawings of a preferred embodiment of the invention.

BRIEF DESCRIPTION OF THE DRAWING

FIG. 2A is a rear panel view of the control and display console of FIG. 2.

FIG. 4 is a block diagram of the hardware architecture of the system of FIGS. 2 and 3.

FIGS. 6A-1-6D is a series of drawings illustrating a flowchart for the ROM (read only memory) program which drives the invention.

DESCRIPTION OF THE PREFERRED EMBODIMENT

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
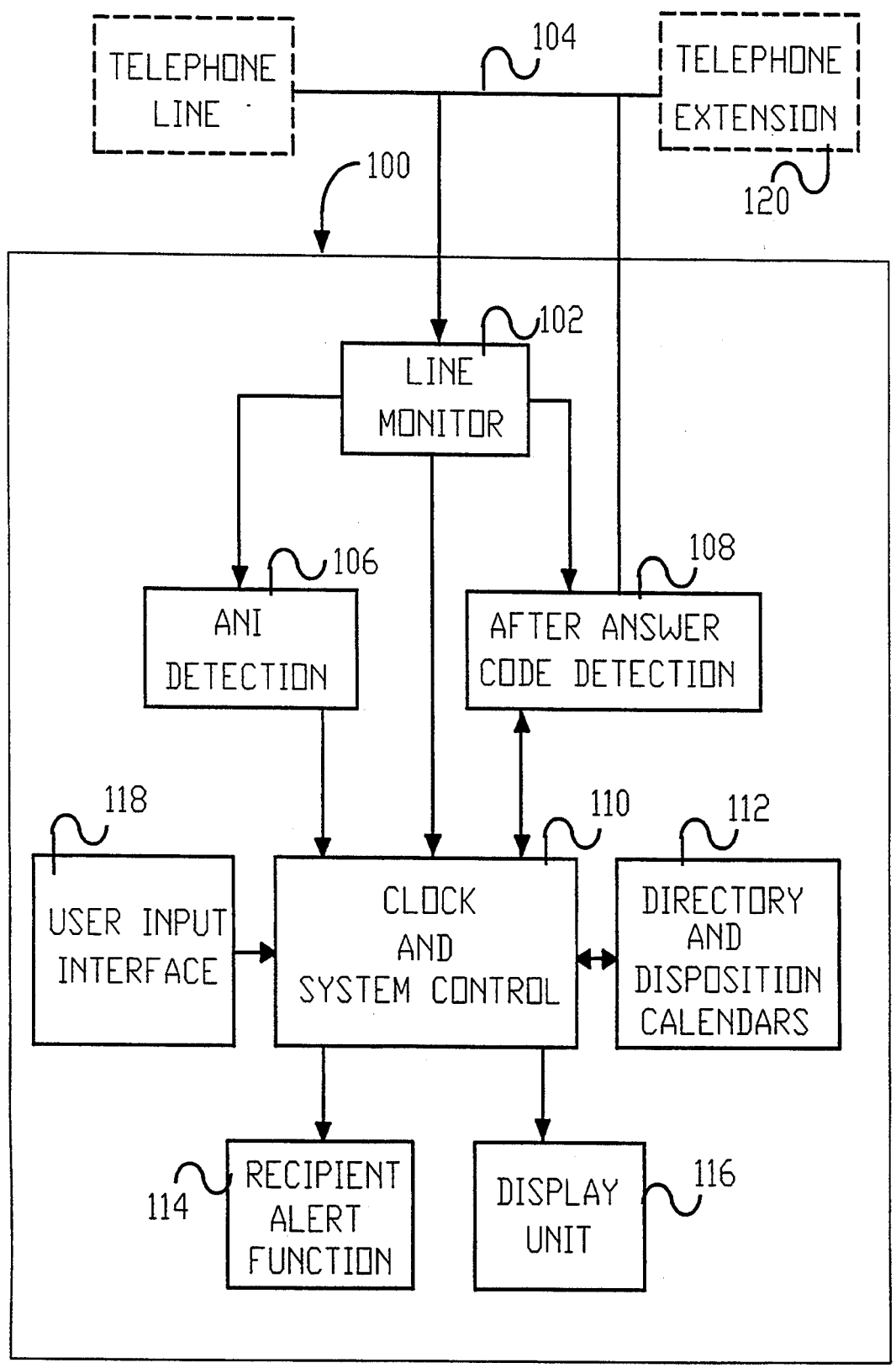
FIG. 1 is a functional block diagram illustrating a periodic automatic incoming telephone call identification and disposition system according to the present invention.

Referring to FIG. 1, there is shown an automatic incoming telephone call identification and disposition system 100 in accordance with a preferred embodiment of the present invention comprising a line monitor 102, an ANI detection apparatus 106, an after answer code detection apparatus 108, a system clock and control module 110, a module of directory and disposition calendars 112, recipient alert function apparatus 114, a display unit 116 and a user input interface 118.

Line monitor 102 monitors the state of the telephone line 104 and determines: (1) whether the line is in an on-hook or off-hook state; (2) whether, during an on-hook state, the line is in a ring cycle; and (3) whether, during an off-hook state, the line is transmitting Dual Tone Multi Frequency (DTMF) or other automated information signals. The ANI detection apparatus 106 is used for detecting the calling number between ring cycles where the Automatic Number Identification (ANI) service is provided by the telephone company. The after answer code detector apparatus 108 sets the line in an off-hook state, requesting and detecting an identifying caller response. The system clock and control module 110 coordinates all component parts of the invention and compares the identification(s) supplied at the phone line interface to entries in the module of directory and disposition calendars 112 and determines the appropriate response to the caller by comparing the day and time of the call to call disposition calendars associated with the matching directory entries.

The recipient alert function apparatus 114 is used for alerting the recipient at either a local or remote location that a call is waiting. The apparatus 114 is operated by the control module when the selected disposition calendar so requires. Display unit 116, preferably a visual LCD screen display, is used by the control module to inform the recipient of the identification number(s) received and the names and other information found in the directory entries matching those numbers. The display unit 116 may display other information as required. The user input interface apparatus 118 is also provided and permits the user to create new or update directory entries and disposition calendars at 112 as well as request to view and use their contents via the display unit 116. Any number of extension telephones 120 (shown in phantom) which may be connected to the telephone line will be unaffected by the presence of the system 100 of the present invention on the same line. However, the system 100 would sense the activities of any such extension telephone 120 through the line monitor 102.

In a preferred embodiment, the system 100 is packaged to fit within a console 150. FIG. 2 shows a top view of a console main panel 200 and FIG. 2A shows an end view of console rear panel 250. The basic invention is supplemented with a standard complete telephone handset 202 for full-service telephone system function capability and a set of extra telephone plugs 204 so that other telephone devices may, along with the handset 202, be controlled by the system controller 110 as demanded by the calendar identified by an incoming call. A digital communications port 206 is also provided to the real console panel 250 for performing up- and downloads of directories, calendars and other databases, or individual call information.

In operation, the recipient is alerted to incoming calls by sound generated from the local speaker 208 of the recipient alert apparatus speaker 114. The recipient may also view caller identification and other information on the LCD screen display 210 of the display unit 116, and may enter information into the directory, calendars, and other system databases by using the alphanumeric keyboard 212a, b and other function keys 212c of the use interface 118. The recipient alert function or speaker 114 may be supplemented by ringing extra telephone equipment plugged into the invention, and by sound generated at distant (remote) extension alert units (shown in FIG. 4) which are controlled by signals sent through the building's power supply lines via the invention's power input plug 214.

Figure 3:
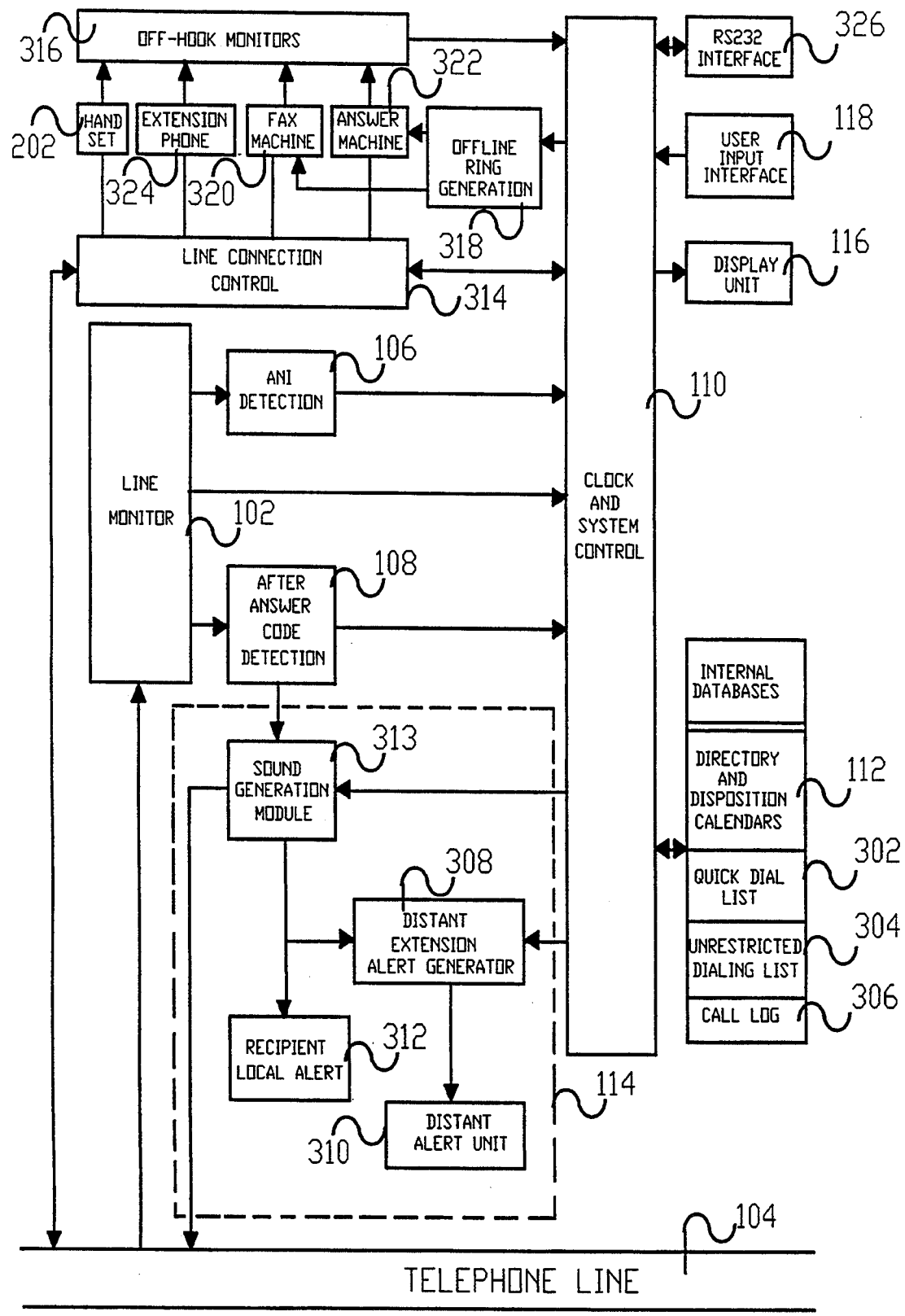
FIG. 3 is a functional block diagram of the preferred embodiment shown in FIGS. 2 and 2A.

The functional diagram of FIG. 3 indicates the expanded function in this preferred embodiment. The directory and disposition calendars 112 are supplemented by: (1) a list of abbreviated numbers for simple dialing access to often called parties indicated in FIG. 3 as quick dial list 302; (2) a list of area codes and prefixes which may be dialed from the invention, or from any telephones connected to the invention, without restriction even when a user has limited outgoing calls indicated as unrestricted dialing list 304; and (3) a call log 306 which contains information about incoming calls, outgoing calls, or both, and which may also be used as a source for a number to be dialed out.

As mentioned above, the recipient or incoming call alert function 114 is divided into two optional parts including the distant extension alert generator 308 and the recipient local alert 312. The distant extension alert generator sends signals to one or more special distant alert units 310 so that an incoming call can be announced under the invention's control in distant parts of the building. The recipient local alert 312 produces a similar announcement within a limited radius of the invention console 150 (i.e. on speaker 208). Both alert function parts use sound signals generated by the sound generation module 313.

For embodiments containing a telephone, or having telephones plugged into them, the line connection control function 314 can switch each telephone independently onto or away from the telephone line 104 as required either by the user's directory calendars 112 for incoming calls, or by outgoing use. Individual off-hook monitors 316 inform the control module whenever a telephone controlled by the invention is taken off-hook or put back on-hook.

The preferred embodiment is supplied with an internal handset 202 and standard jack connections for three other extensions. Two of those extensions may be used for special purposes on incoming calls as controlled by calendar entries. For this reason, there is an extra capability of off-line ring generation 318 for them. If a FAX machine 320 and/or an automatic answering machine 322 is plugged into an appropriate console jack, a ring signal can be sent to the telephone to begin the fax machine or answering machine operation if requested to do so by the current calendar for an incoming call even if the identification of the caller took place after internal answering. This permits the user to program the device to selectively send some callers to these machines and not to others on the basis of identification, even when ANI identification is impossible. A normal extension phone 324 plugged into the extra extension jack does not require an off-line ring capability, since it does not function in an automatic mode.

An RS232 interface module 326 is also supplied to pass data between the invention and any external device equipped with a like interface. This allows a user with a large set of databases to quickly duplicate them in another unit of this invention, which would be useful if the user had more than one telephone service line.

Figures 1, 6A:
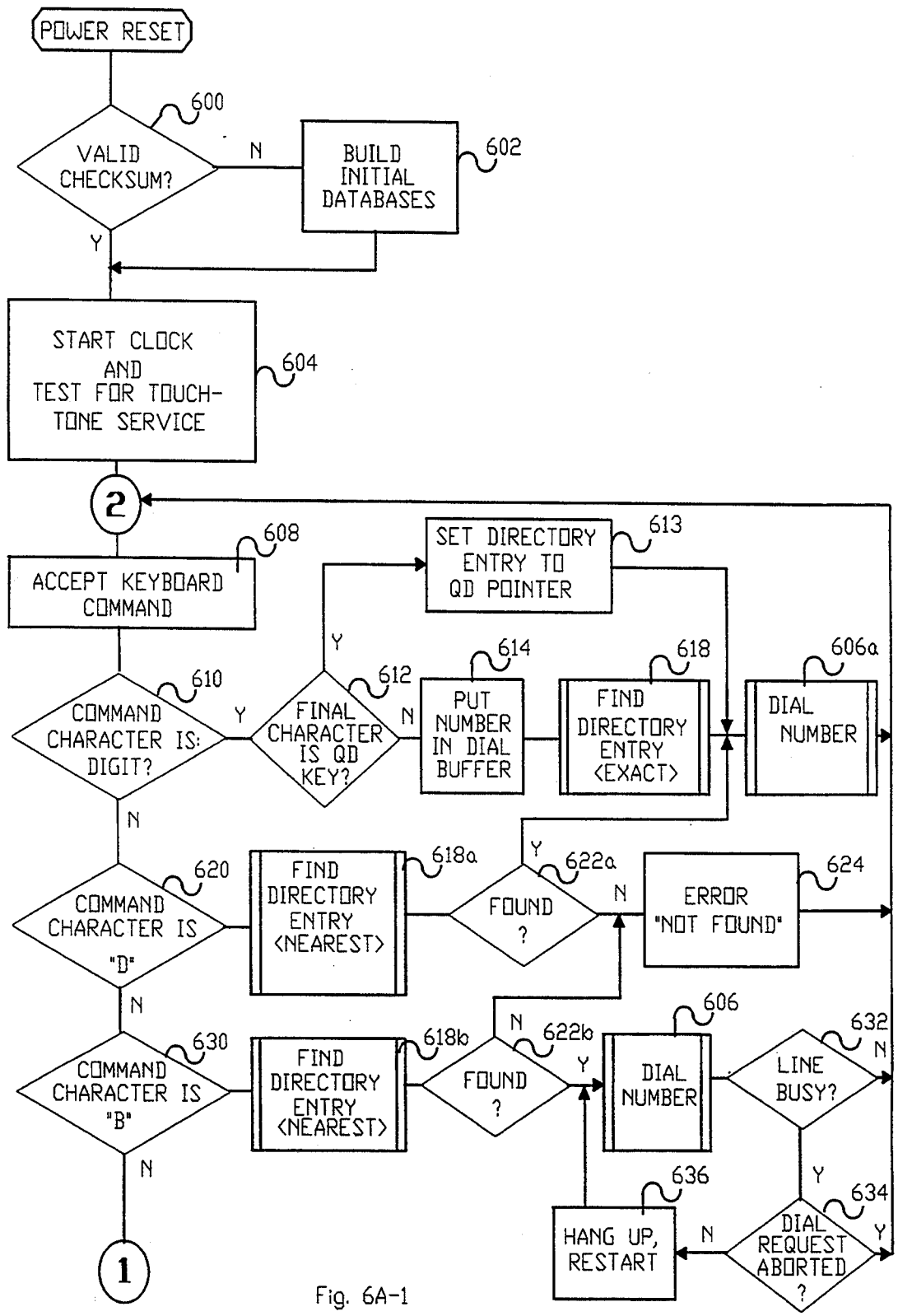
Figures 2, 6A:
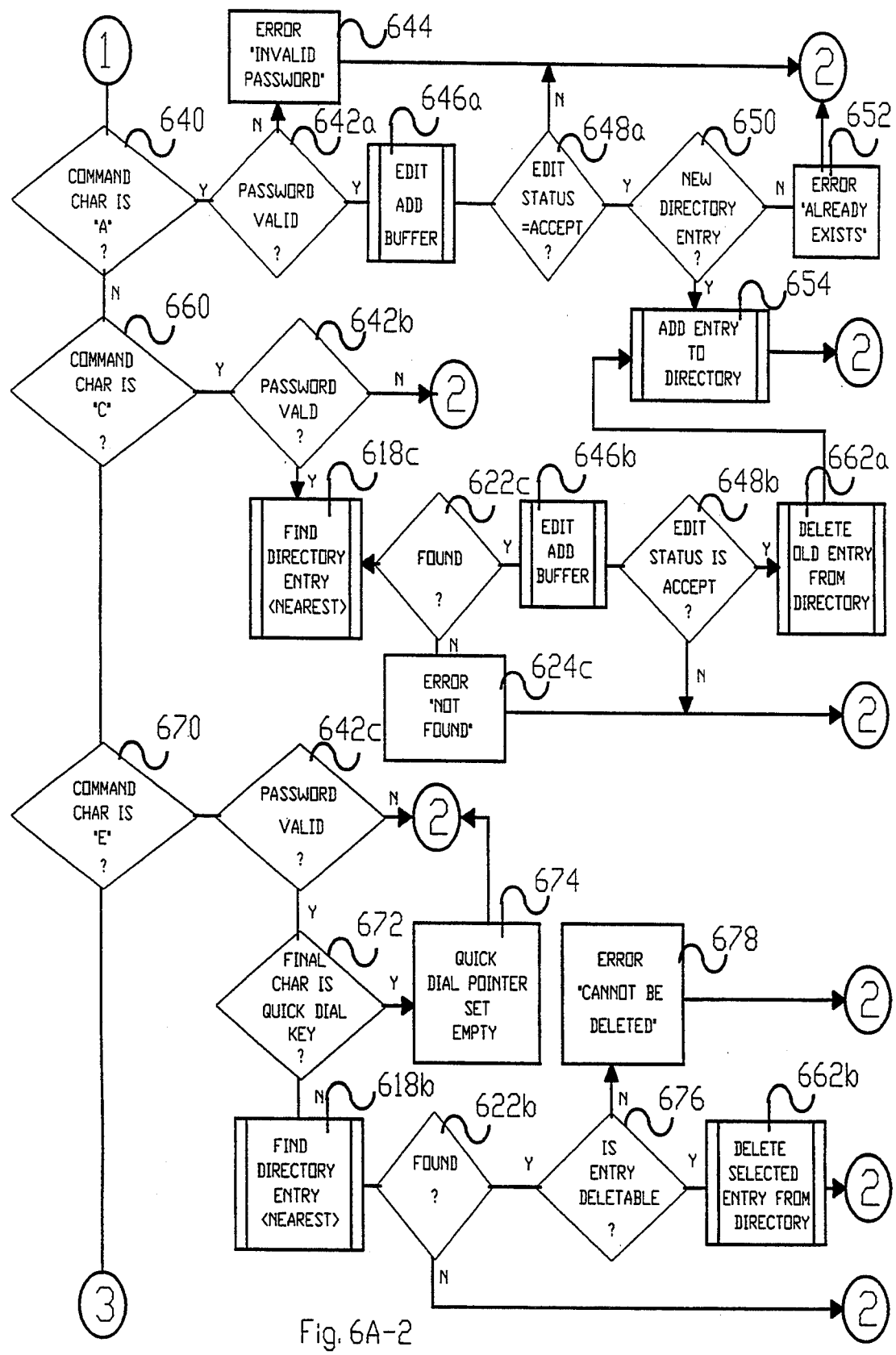
Figures 3, 6A:
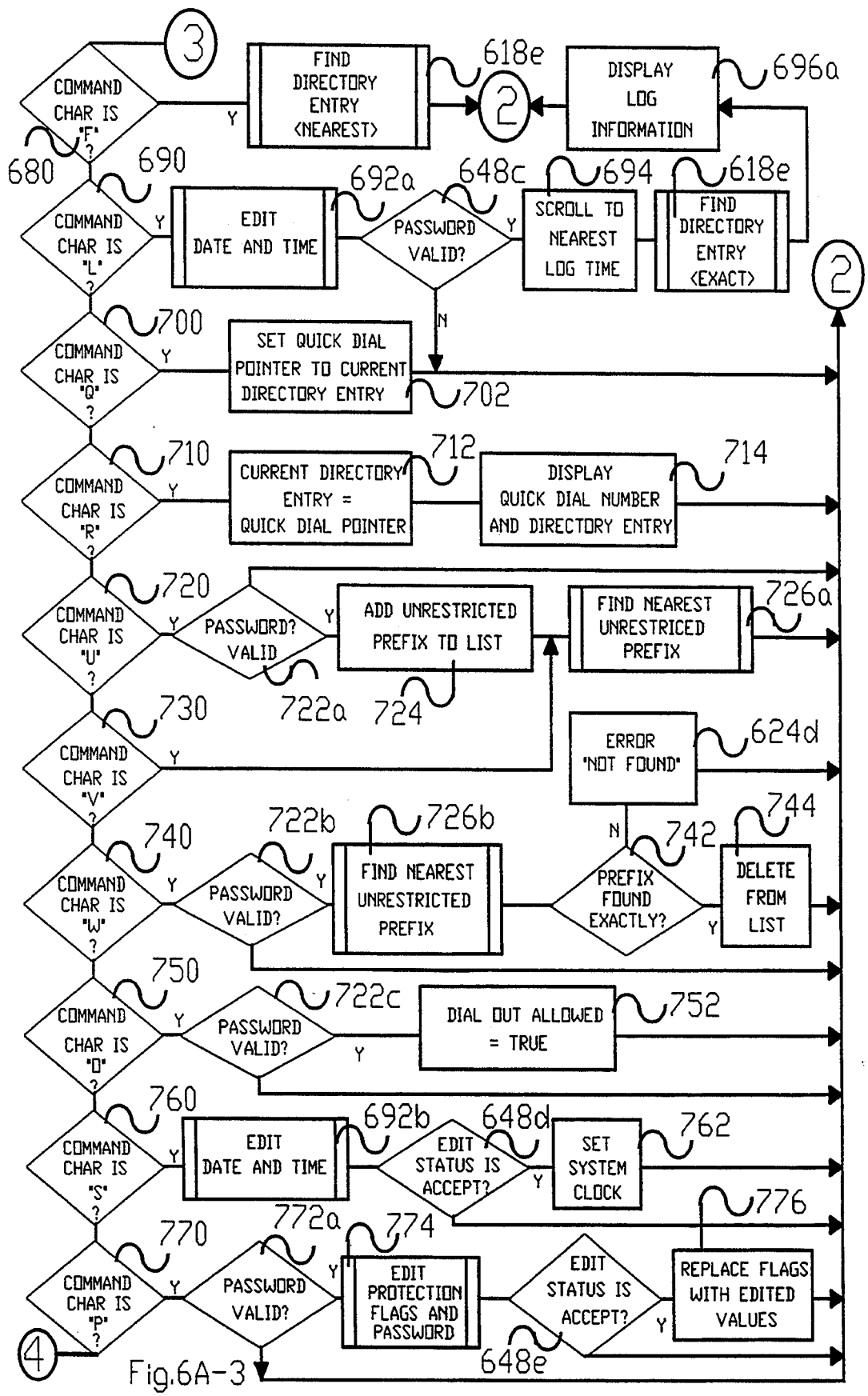
Figures 4, 6A:
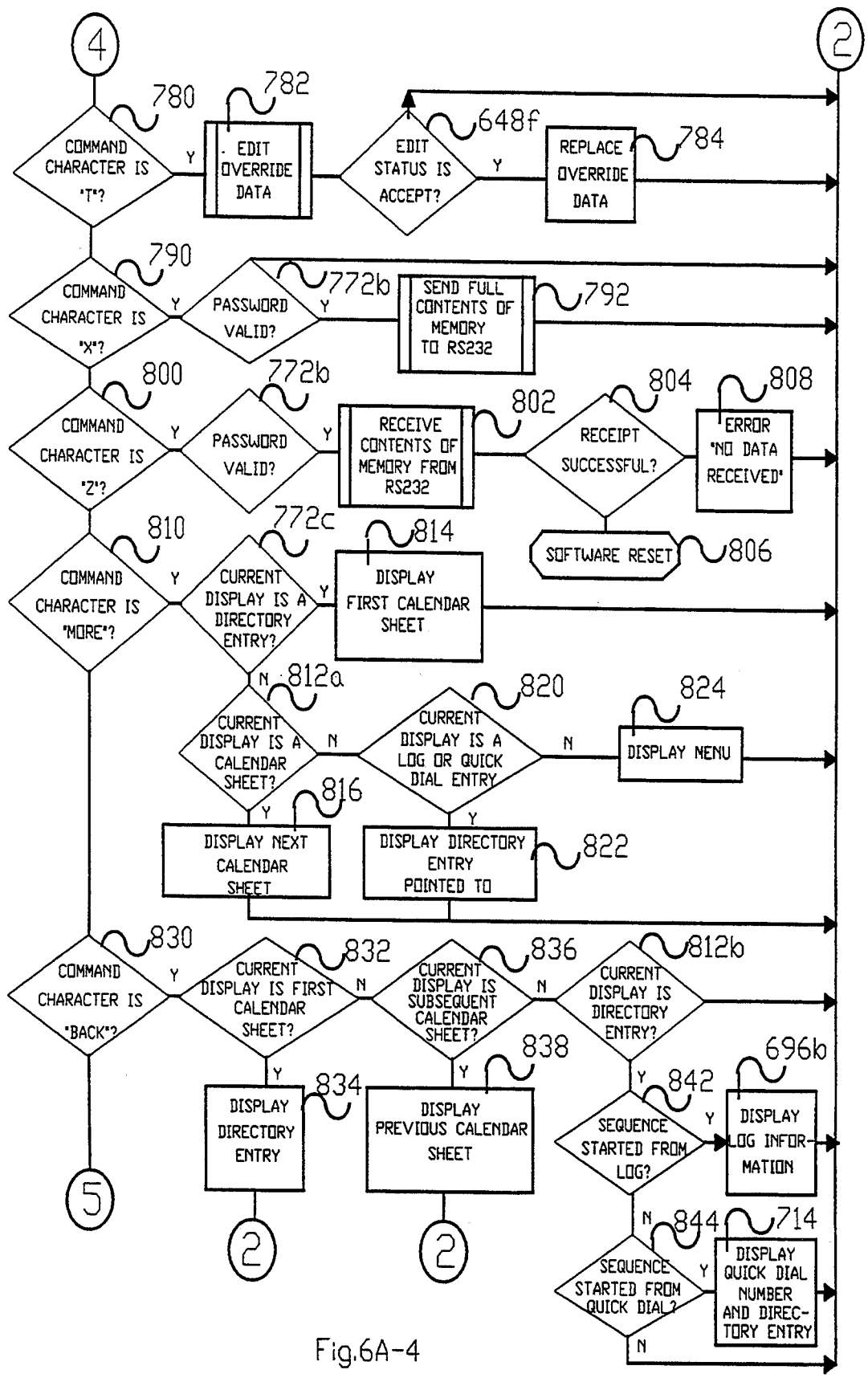

As is best seen in FIG. 4, the hardware implementation of the preferred embodiment makes considerable use of commercially available off-the-shelf components. The heart of the device is a microprocessor 400. Any known microprocessor containing its own internal clock circuitry may be used in the present invention. An example microprocessor used in the preferred embodiment is the Intel 8052 Single Chip 8 Bit Microcontroller. The microprocessor 400 is connected by the internal bus 402 to a ROM 408, which contains the program that directs the system, and is also connected to a RAM bank 404, which is used to store the programmable databases. The RAM 404 is provided with a battery backup 406, so that the programmed data can survive a loss of external power for a period of several weeks. The microprocessor 400 is connected to all other system modules via the peripheral bus 410, which may be supplemented by bus multiplexers 412 as needed to supply the microprocessor with sufficient lines to service all devices. An example bus multiplexer for this purpose is the Intel 8255 Programmable Peripheral Interface.

Figure 5A:
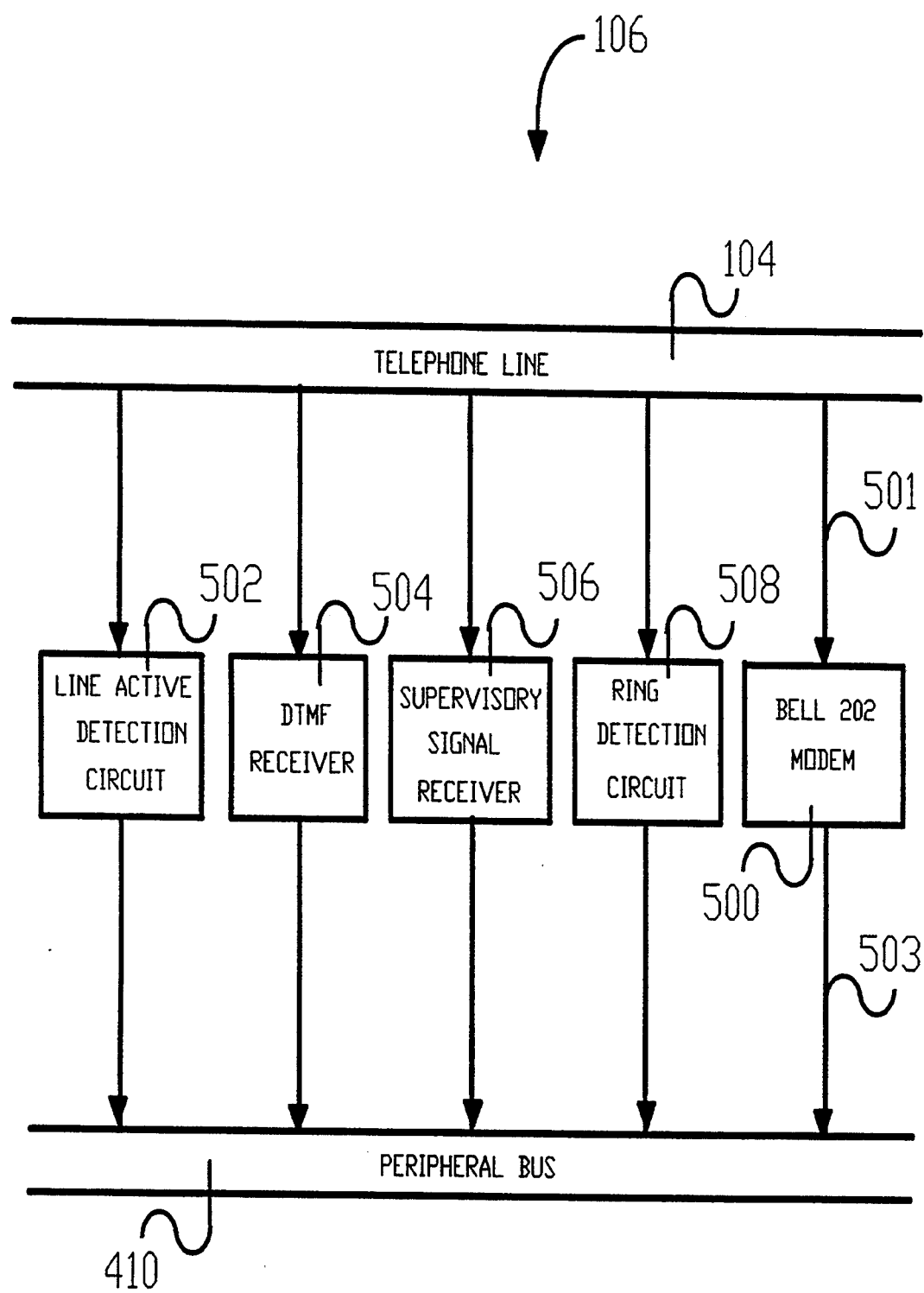
FIGS. 5A–5E is a series of drawings which illustrate an expanded detailed diagram of the hardware diagram of FIG. 4.
Figure 5A:
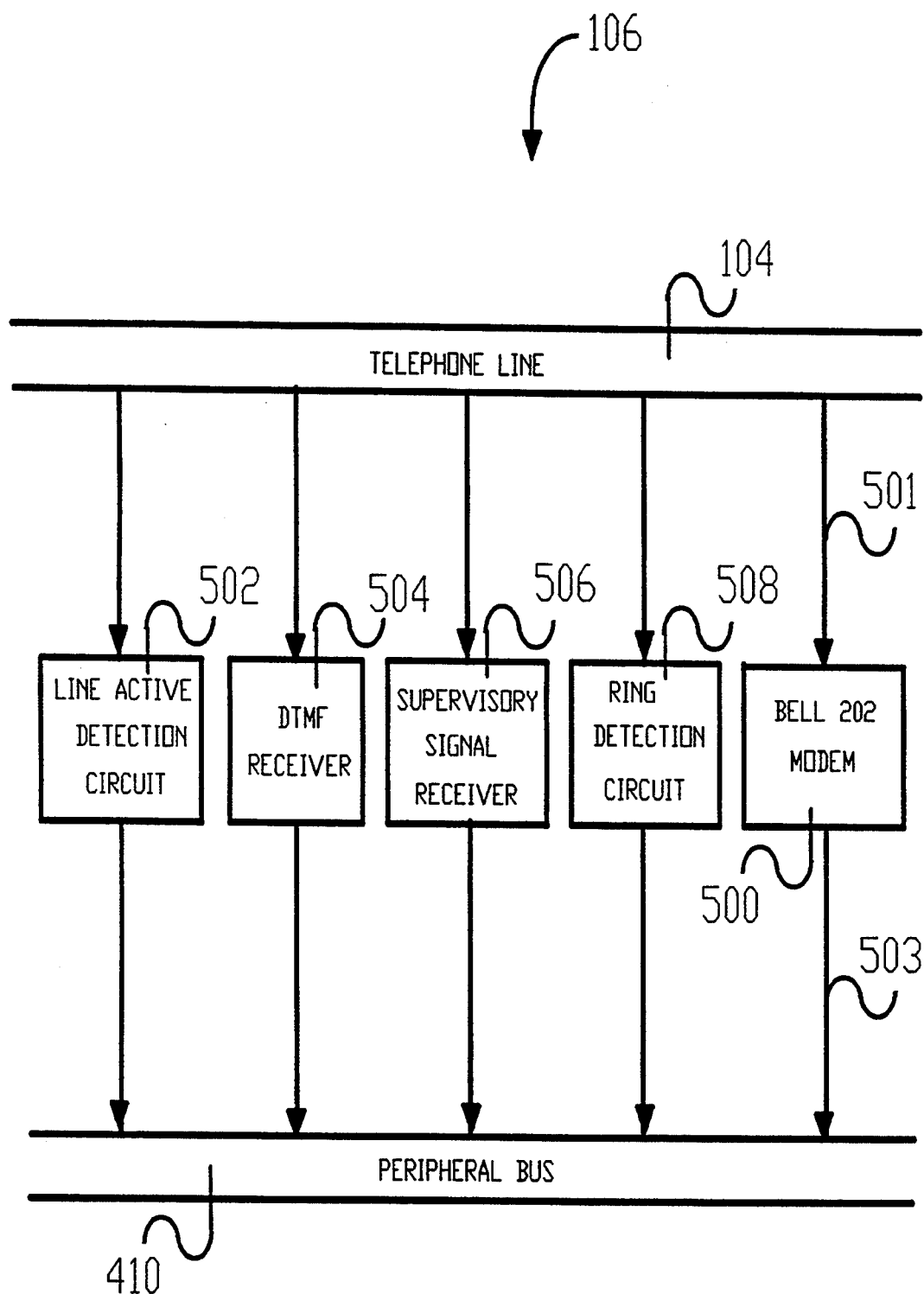

Referring now to FIG. 5A, the ANI detection device 106 is described in detail. The telephone line signal 104 is fed into a known Bell 202 Modem device 500, such as the Texas Instruments TCM3105JL FSK Modem, which is connected to the peripheral bus 410. The line monitor sensors 416 (FIG. 4) deliver other information from the telephone line 104 to the microprocessor 400. These sensors are also detailed in FIG. 5A.

A line active detection circuit 502 such as the Teltone M-959 Dial Pulse Counter and Hook Status Monitor allows the microprocessor 400 to determine whether or not an off-hook telephone is connected to the telephone line 104. The line active detection circuit 502 also detects and counts the pulses of pulse telephone extensions being dialed.

The DTMF receiver 504 is an integrated circuit such as the Teltone M8888 DTMF Transceiver, which decodes signals received on the telephone line 104 when a caller is being identified after-answer, or when a local telephone extension is being dialed. A supervisory signal receiver 506 such as the Teltone M982 Precise Call Progress Tone Detector detects the presence of various supervisory tones on the telephone line 104, allowing the microprocessor 400 to monitor the progress of a call. A ring detection circuit 508 such as the Texas Instruments TCM1520A Ring Detector can inform the microprocessor 400 of the ring cycle of an incoming call, thus cueing the system to begin the identification process.

As is indicated generally by dashed-line region 415 in FIG. 4, for every telephone device 510 (i.e., primary telephone 511, extension telephone 513, fax 515 or answering machine 517) controlled by the system of the present invention there is associated therewith a line monitor sensor 416, a line connector control circuit 418, and an off-hook detector 420.

Figure 5B:
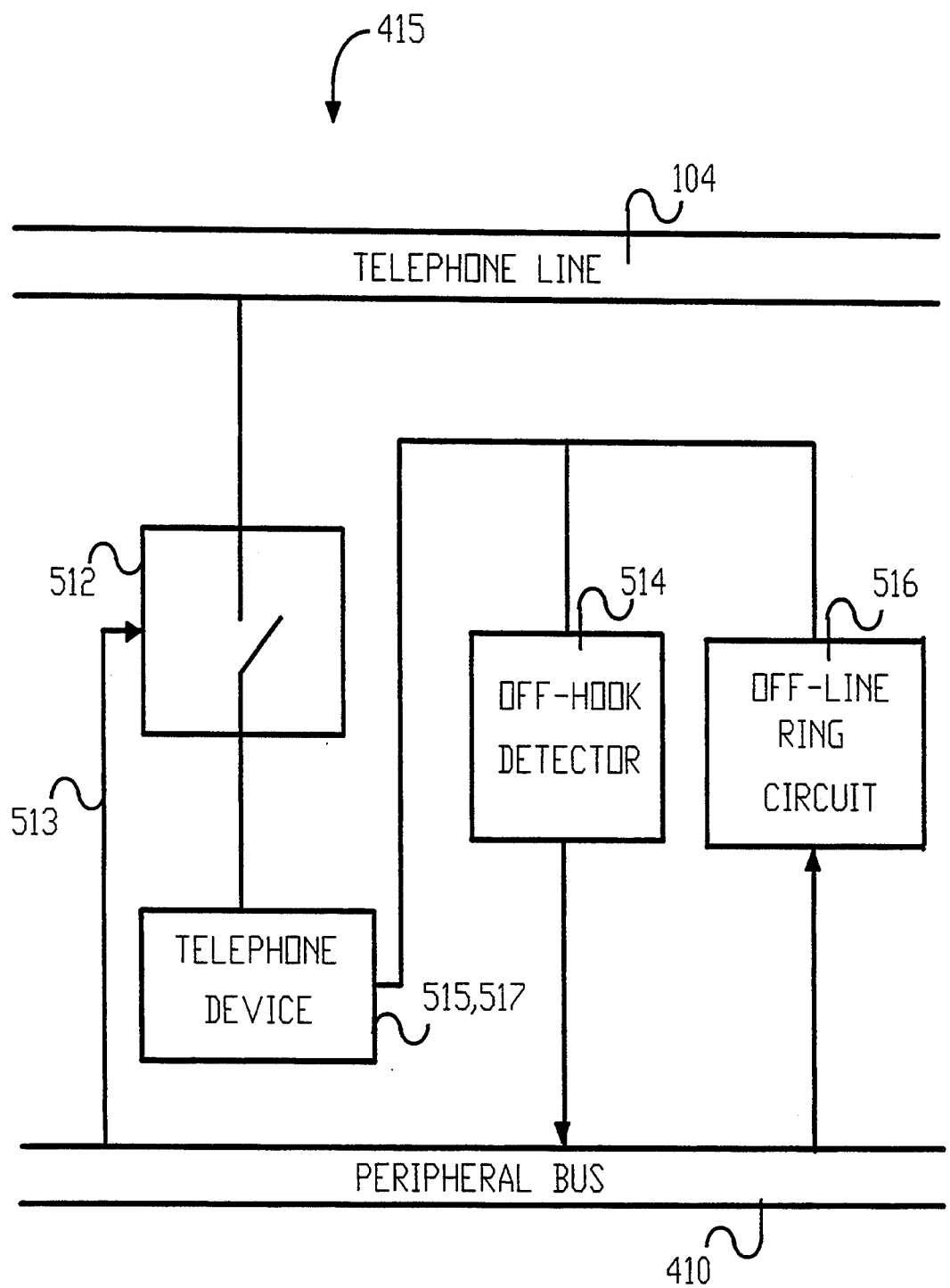

As is seen in FIG. 5B, for the special case where the telephone device 510 is an automated machine such as the example fax machine 515 or answering machine 517, there is also provided an off-line ring generator circuit 516. The fax 515 or answering machine 517 is connected to the system console of the present invention by a standard telephone connection jack 204 (see FIG. 2A). A switch 512 controlled by the microprocessor 400 via switch control line 513 can connect or disconnect the fax 515 or answering machine 517 to the phone line 104 in accordance with the system program and the databases. An off-hook detector 514 informs the microprocessor 400 whether the fax 515 or answering machine 517 is off-hook or on-hook. Two of the jacks are supplied with an off-line ring circuit 516 with which the microprocessor 400 can cause the fax 515 or answering machine 517 to detect a normal ring cycle while it is disconnected from the telephone line 104. This allows the invention to start the operation of such automated devices as answering machines and FAX machines after the caller identification process has been performed, even when ANI identification is not possible.

Figure 5C:
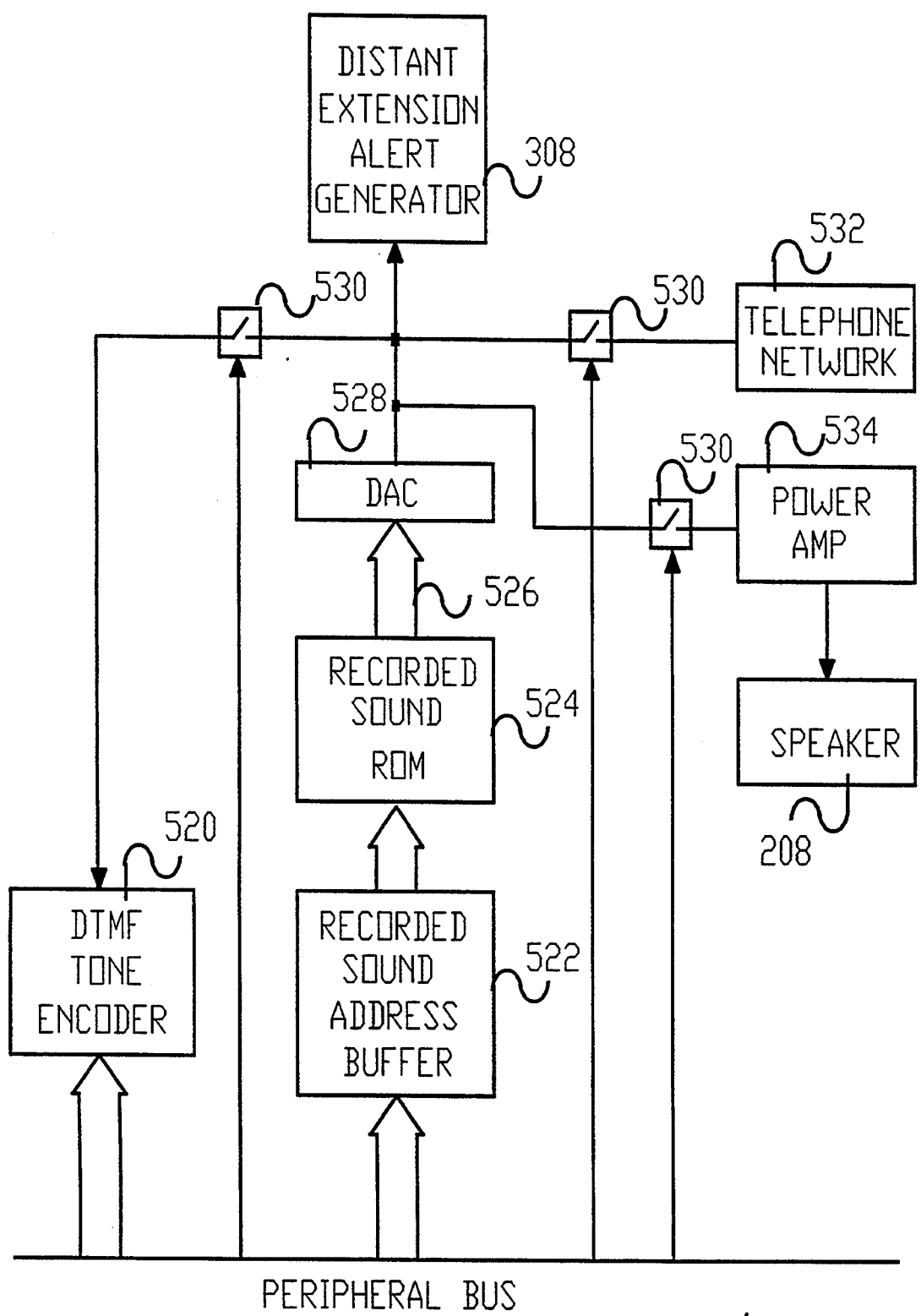

The detail of sound generation system 424 of the invention is further illustrated in FIG. 5C. A tone encoding device 520, such as the above mentioned Teltone M8888 DTMF Transceiver, is used to generate DTMF signals for automatic dialing. Since such devices can produce single-tone sounds as well, it is also used to produce special local attention signals, such as an error beep used to inform the user that an invalid character or command has been received over the user interface. A practically unlimited variety of sounds can be produced by the recorded sound generator which begins with a recorded sound address buffer 522 that stores addresses delivered on the peripheral bus 410. The stored address in buffer 522 accesses a sound data byte stored on the recorded sound ROM 524, which is delivered on the sound data bus 526 to a digital-to-analog converter (DAC) 528. A preferred Digital to Analog Converter for use in the present invention is the National Semiconductor DAC0831.

By changing the recorded sound address buffer at the same rate that the stored sound was recorded, the sound can be reproduced for use by the system program. This system may be used to store human voice messages to serve a variety of purposes. Such as, for example, to request a caller to identify himself or herself, to alert the call recipient with a voice message as an alternative to a typical telephone ring, and to give special directions or error messages to a user. It also allows the invention to be more effectively used at night, and facilitates use of the system by people with limited vision.

A plurality of switches 530, controllable via the peripheral bus 410, can shunt sound from the recorded sound ROM 524 and/or the tone encoder 520 to either the console speaker 208, the telephone voice network 532, or the distant extension alert generator 308, or any combinational grouping thereof. The volume of sound directed to the speaker 528 is controlled by a commonly available power amplifier 534, such as, for example, the National Semiconductor LM386 Low Voltage Audio Power Amplifier.

Figure 5D:
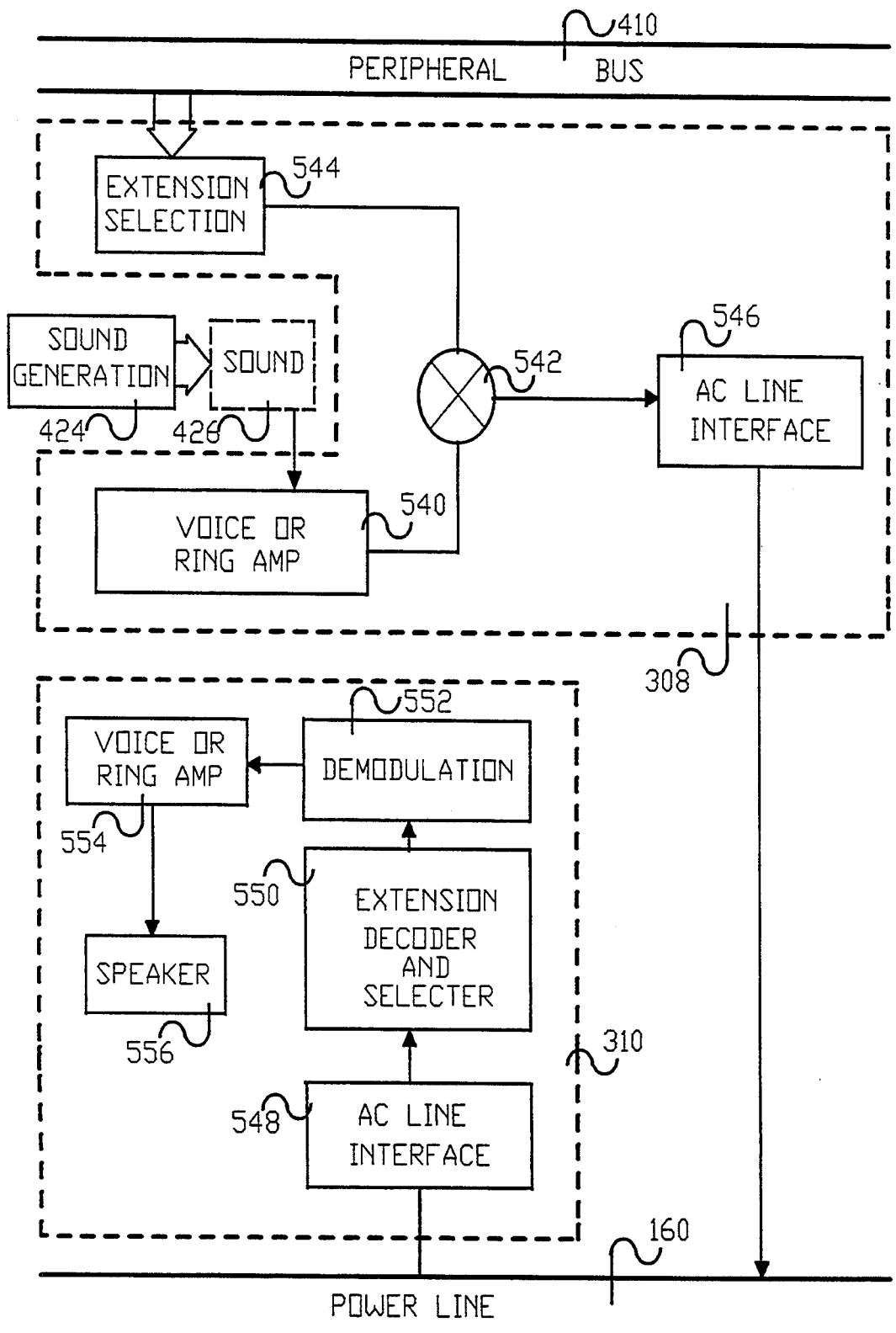

The distant extension alert generator 308 and the distant alert unit 310 are described in greater detail with reference to FIG. 5D. Sound 426 from any source in the sound generation system 424 is passed through a commercially available amplifier 540, such as the National Semiconductor LM386 Low Voltage Audio Power Amplifier, and is amplitude modulated onto any of several base frequencies at module 542. The base frequency used is selected by an extension selection circuit 544 controlled by the microprocessor 400 from the peripheral bus 410 on the basis of data stored in the incoming call calendars 112. The modulated signal is fed through an AC line interface 546 into the external power line 160 via the system 120 v. AC input. Distant extension alert units 310, which plug into the same power line or circuit 160 within a moderate radius, pick up the signal through a similar AC line interface 540 in an inverted sequence, which acts as a level control. A distant extension alert unit 310 is configured by the extension decoder and selector 550 to decode only one of the possible base frequencies. When a signal with the appropriate frequency is present, the signal is demodulated at 552, amplified at voice or ring amp 554, and reproduced on the distant extension alert unit's speaker at 556.

Figure 5E:
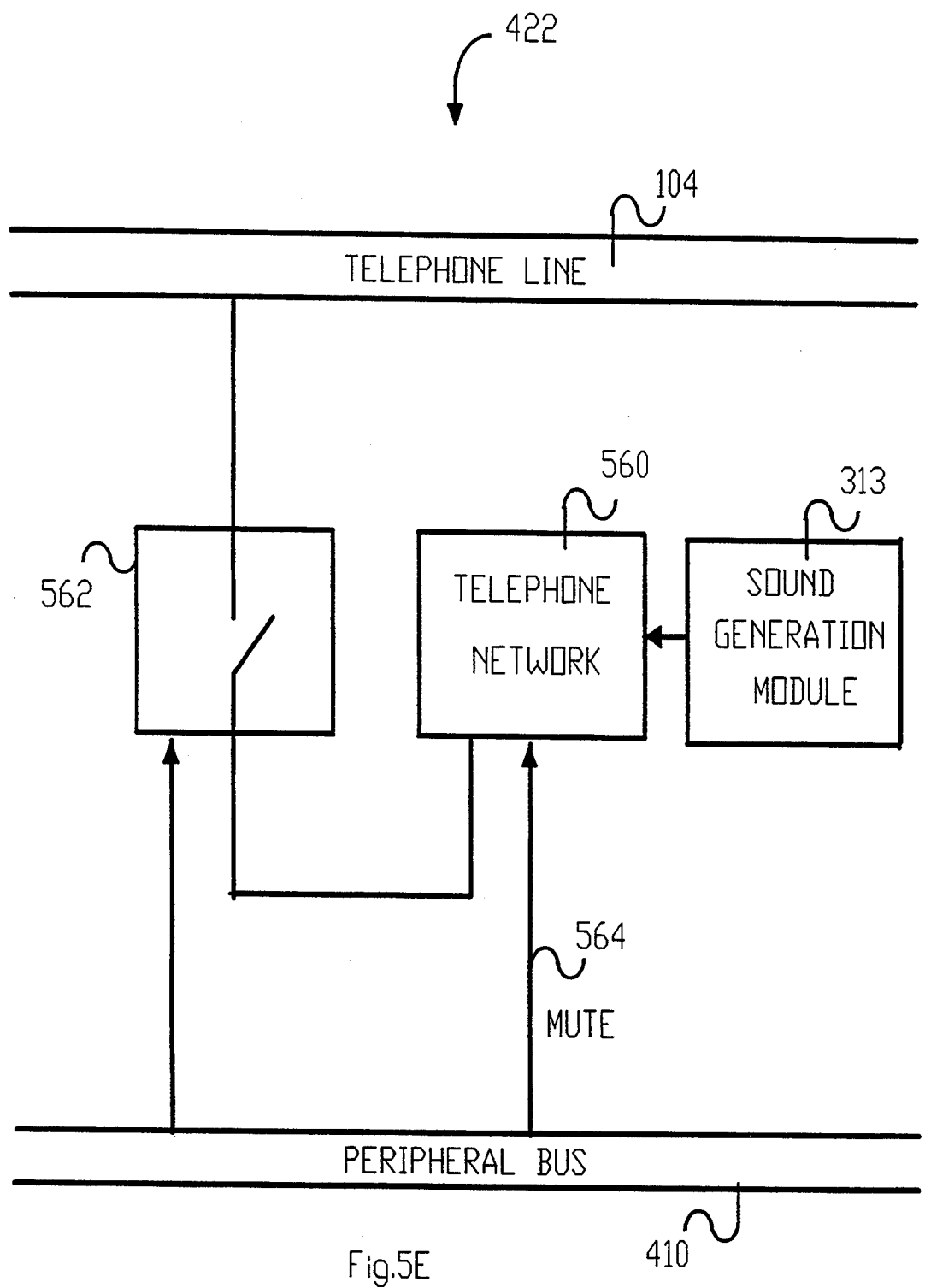

The telephone voice network circuit 422 is described in greater detail with reference to FIG. 5E. A standard telephone network device 560, such as, for example, the Motorola MC34014 Telephone Speech Network with Dialer Interface, can be connected to or disconnected from the telephone line 104 by a switch 562 controlled by the peripheral bus 410. When an incoming caller cannot be sufficiently identified through the ANI, switch 562 is closed and the telephone network device 560 functions as a telephone, feeding sound from the sound generation module 313 to the line 104 to request further identification. During this activity, the network's receiver must be muted by the microprocessor 400 via signal information sent along the bus 410 and line 564. This same circuit is used to take the telephone line "off-hook" and deliver DTMF signals when the invention is requested to dial a number stored in one of its databases or buffers. For phone lines where the service cannot decode DTMF signals, switch 562 can be closed and opened rhythmically to produce pulse dialing signals.

Figures 5, 6A:
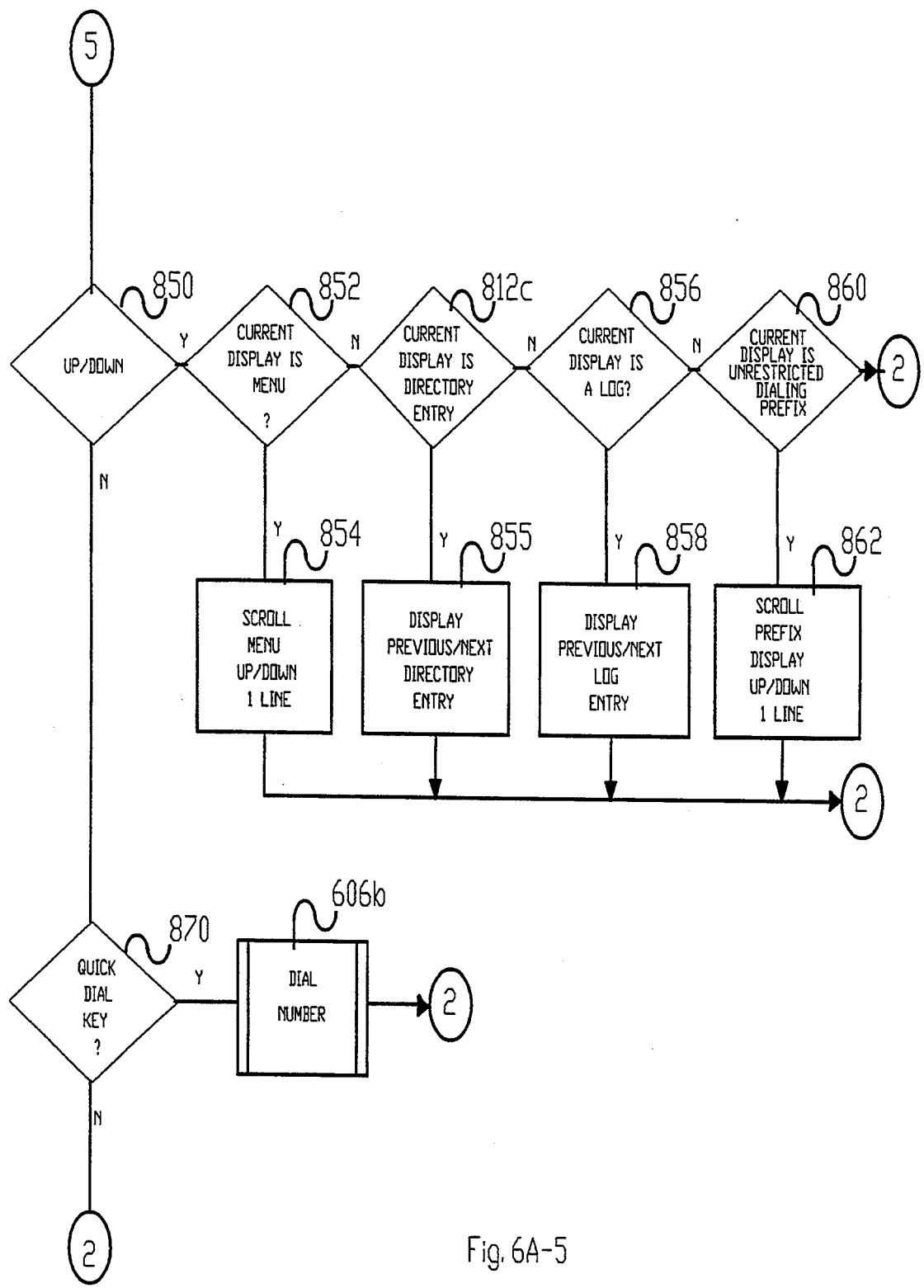

The invention is driven by a ROM resident software program consisting of four principle processes which are described in flowchart format with reference to FIGS. 6A–6D. FIGS. 6A-1 to 6A-5 is a series of drawings showing the main process flowchart for the command processor. Upon system power up, a power reset is caused to be issued to the microprocessor 400, which automatically invokes the command processor. The command processor checks the database checksum 600 to decide whether this is a warm or cold start. On a cold start (invalid checksum), it builds a set of initial default databases and calculates a checksum at 602. Thereafter every alteration to a database must also recalculate the checksum at 602. The process starts the system clock, tests the telephone line for DTMF service, and enables the system interrupts at 604. The DTMF service test then sets an internal variable which determines whether the Dial Number subroutine 606a, produces DTMF or pulse coded digits. The main process loop accepts commands at 608 from the system keyboard 212 (see FIG. 2) and then executes them. Commands are distinguished by their first character, the command character, and their last character which is either an "Enter" or "Done" key, or the "Quick Dial" key. At all times a "current directory entry" pointer is maintained, which is used as a reference for commands entered without accompanying information.

If, at 610, the command character is a digit, the final command character is tested at 612. If it is a "Quick Dial" key, the current directory entry is set to the quick dial (QD) pointer at 613 found at the appropriate entry number in the quick dial list and the directory telephone number is loaded in the dial buffer at 614 and the number is dialed. The dial number subroutine 606 disables non-clock interrupts before dialing, to prevent interference from the outgoing call process. If the entry was not a quick dial request, then the digits entered are stored in the dial buffer for possible later editing at 614.

The directory search routine (Final Directory Entry <exact>) 618 checks the directory for a telephone number or identification code which exactly matches a string of digits, or for a name matching any string containing non-numeric characters, and then displays that directory entry on the system display unit 210 (see FIG. 2). The Find Directory Entry routine has one directive parameter valued either <exact> 618 or <nearest> 618a, 618b. If an exact match is requested, and none is present, then a default entry "Unknown Caller" is chosen and displayed, and the original search string is placed in the dial buffer at 614. If the nearest match is requested, then the entry that most closely matches the input character string is chosen and displayed, and its telephone number is placed in the dial buffer at 614. If the search string has no characters, then a match is assumed, and the most recently selected directory entry is used.

The Dial Number routine 606a causes the line to be placed internally in an off-hook condition, and an appropriate sequence of DTMF digits or pulse coded digits, depending on service available, to be sent after a line sensor detects the dial tone. During the Dial Number routine, outgoing and incoming call interrupts are inhibited. For digit string commands, this is the end of command.

If at 620 the command character is "D" for "dial" the directory is searched for the nearest match to the input string at 618b. If at 622a the search found an exact match the referenced number is also dialed. If not, the "not found" message 624 is displayed (on display 210) with the closest match.

If at 630 the command character is "B" for "busy dial" the directory is searched for the nearest match to the input string at 618b. If at 622b the search found an exact match, the number is dialed. The system then monitors the call progress tones through a line sensor 416. If a busy tone is detected at 632, the keyboard input buffer (not shown) is checked for a possible "Cancel" command at 634. If none, the system puts the line 104 back in an on-hook condition, waits briefly, and restarts the dial, 636.

Referring to FIG. 6A-2, if at 640 the command character is "A" for "Add entry" the user's access to the directory is tested at 642a. The user is allowed access to the directory if no security has been set for it, or if security has been set, the user is allowed access after he/she enters the appropriate password. Failure to pass the security test causes the "Invalid Password" error to be displayed on LCD display 210, and the command is ignored at 644. Otherwise, the Edit Add Buffer routine 646a is invoked. This allows the contents of a buffer consisting of a directory entry and its associated calendar of dispositions to be changed as desired by the user by using the standard auxiliary keys of the keyboard 212c.

For example, the arrow and "Enter" (enter field) keys of the system keyboard 212c may be used to position a typing cursor and indicate when a field is edited. The up and down arrow (scroll) keys may be used to select some other existing calendar of dispositions, possibly for further tailoring to the entry being edited. The "Done" key may be used to indicate that the buffer edit is done and acceptable. The "Cancel" key may be used to cause the edit to abort without changing the directory.

In the "Add entry" command, the edit status 648a is checked on return from the Edit Add Buffer routine 646a. If at 648a the status is acceptable (i.e., edit ended with the "Done" key), the created entry is checked against the existing directory at 650. If the entry is not unique, then the "already exists" error 652 is reported. Otherwise, the new entry is added to the directory and dispositions calendar 112. The Directory Add routine 654 inserts the entry in its proper sequential position and adds its associated calendar of dispositions if that calendar does not already exist, or updates the calendar if it has been changed. Since multiple directory entries may use the same calendar, a warning message is issued during the editing process when a user changes a calendar of dispositions which is already being used by other directory entries. After the data is added, the database checksum is recalculated at 600.

If at 660 the command character is "C" for "Change entry" and the user passes the valid password directory access test at 642b, the directory is searched for the referenced entry at 618c. If not found at 622c, the nearest entry and the "not found" error message are displayed at 624c. If found, the Edit routine is invoked for the Add Buffer at 646b. If the edit is acceptable, the Delete Entry routine 662a is invoked to delete the existing entry, and the Directory Add routine 654 is invoked with the new data. The Delete Entry routine 662a does not delete the calendar associated with the entry, however. It remains available for possible future use, even if no directory entry points to it after the deletion. If the edit is canceled, no change is effected.

If at 670 the command character is "E" for "Erase entry" and the user passes the directory access test at 642c, the final character of the command string is checked at 672. If it is the "Quick Dial" key then the quick dial pointer referenced by the number entered is set to empty at 674. Otherwise the directory 112 is searched for the entry. If the entry is not found exactly, the "not found" error is issued, and the command is aborted. If at 618d and 622d the entry is found exactly, it is tested for possible deletion at 676. Default directory entries which describe processing for unknown callers may not be deleted, and an error "not deletable" is displayed at 678 if an attempt is made to erase one of them. Otherwise the selected entry is deleted from the directory 112. If any quick dialing pointers reference the deleted entry, they are set at empty.

Referring now to FIG. 6A-3, if at 680 the command character is "F" for "Find entry" the directory entry which most nearly matches the user's input at 618e becomes the current directory entry and is displayed.

If at 690 the command character is "L" for "Log entry" the edit routine is invoked for the date and time buffer at 692a. If the edit ends with an accept command at 648c, the call log 306 (FIG. 3) is searched for the first entry whose start time is greater than or equal to the date and time entered at 694, otherwise the command is aborted. The directory 112 is then searched for the number at 618e in the log entry (306) and the log data is displayed at 696.

If at 700 the command character is "Q" for "Set Quick Dial entry" the quick dial entry pointer entered with the command is set to point to the current directory entry at 702.

If at 710 the command character is "R" for "Review Quick Dial entry" the current directory entry is set to the quick dial pointer whose number accompanied the command at 712. The quick dial number and directory entry are displayed at 714.

If at 720 the command character is "U" for "Unrestricted Prefix" and the user passes the access test for unrestricted dialing at 722a, the three (prefix) or six digit (area code plus prefix) prefix is added to the list of prefixes which may be dialed out without special permission from telephones connected to the invention at 724. The list of unrestricted prefixes centered on the added prefix is then displayed at 726a.

If at 730 the command character is "V" for "View Unrestricted Prefix" the list of unrestricted prefixes centered on the prefix that most closely matches the input string is displayed at 726a.

If at 740 the command character is "W" for "Withdraw Unrestricted Prefix" and the user passes the access test for unrestricted dialing at 722b, the prefix that most closely matches the input string is found at 726b. If at 742 the match was exact, the prefix is deleted from the list at 744. Otherwise the "not found" error is displayed at 624d.

If at 750 the command character is "O" for "One-time Permission" and the user passes the access test for unrestricted dialing at 722c, a "one dial allowed" marker variable is set true at 752.

If at 760 the command character is "S" for "Set Time" the edit routine is invoked for the date and time buffer at 692b. If the edit ends with an accept command at 648d, the system clock is set to the new time and date entered at 762.

If at 770 the command character is "P" for "Protect" and the user passes the password valid access test for any data at 772a, the edit routine is invoked for the protection flags and the password itself at 774. If the edit ends with an accept command at 648e, the protection flags and password are replaced with the new values at 776.

In the preferred program, there are three protection flags, including one flag for the directory of callers, one flag for the quick dial pointer list, and one flag for outgoing calls. If the directory of callers flag is set, an attempt to change or delete any directory entry or calendar of dispositions 112 will be prevented unless the user first enters the correct password. If the quick dial pointer flag is set, an attempt to change or delete any quick dial setting will be prevented unless the user first enters the correct password. If the outgoing calls flag is set, an attempt to dial a number whose prefix is not in the list of unrestricted prefixes, or to add or delete entries from that list, will be prevented unless the user first enters the correct password. However, an otherwise protected outgoing call will be permitted if the "one dial allowed" marker is true. This permits the user to control all outgoing calls made either with or through the invention.

Referring now to FIG. 6A-4, if at 780 the command character is "T" for "Temporary Overrides" the edit routine is invoked for data to override dispositions in the calendars at 782. If the edit ends with an accept command at 648f, existing override data is replaced with new data at 784. Override data may consist of a temporary disposition, the time interval when it is to be used and either the priority level up to which it is valid, or the directory entry which is to be temporarily changed. This allows the user to temporarily block out all incoming calls, such as, for example, when the user desires to take an afternoon nap and does not wish to be disturbed. Or when the user desires to block an individual caller who is normally considered acceptable, but has momentarily exceeded the bounds of propriety, etc. In this way, the user is not forced to change the contents of the directory or its calendars for this individual caller only to later go back and change the directory to accept calls from a particular caller.

If at 790 the command character is "X" for "External Save" and the user passes the password valid access test for any data at 772b, the entire contents of the memory RAM 404, consisting of the various databases and other static variables, is sent via an RS232 link through connector 206 to an external device at 792. This permits the data to be either: (1) transferred intact to a secondary telephone device (e.g., an extension phone, a fax or an answering machine) of the invention; (2) saved on a non-volatile storage medium such as a floppy disk; or (3) manipulated by a computer.

If at 800 the command character is "Z" for "External Retrieve" and the user passes the access test for any data at 772b, the system attempts to overwrite the entire contents of the memory RAM 404 with data received via the RS232 link through connector 206. If the Receive routine 802 successfully receives data at 804, the routine terminates with a software generated reset at 806 which restarts the system with the new data. Otherwise the Receive routine 802 terminates with the error "no data received" at 808. The external retrieve, combined with the external save above, allows the entire database to be saved and restored, or to be transferred to a second system, as might be desirable for a user with more than one telephone line.

If at 810 the command character is the "More" (right arrow) key, then the response depends on the most recent database display-producing command. This is achieved by maintaining an internal variable that notes what is currently on the system display such as, for example, a directory entry, a calendar sheet, a log entry, a quick dial entry, or an unrestricted prefix list. For the "More" key, if the current display is a directory entry 812a, then the first calendar sheet for that directory is displayed at 814. If the current display is a calendar sheet 816, then the next calendar sheet is displayed at 818.

In the preferred embodiment, disposition calendars can be composed of any number of sheets (up to the memory maximum), wherein each sheet consists of a set of days of the week, a start time and an end time appropriate to that set of days and the dispositions to be used for incoming calls which occur within the time span for the specified sheet. Calendars spanning longer than one week are not preferred in this embodiment since they require excessive memory. Example, dispositions (caller response options) preferably include: (1) identifying the caller after internal answer via a code; (2) alerting the recipient (i.e., "ringing the phone") at any one of several priority levels, or at the main console and/or at any set of distant extension alert units attuned to a particular frequency; (3) not alerting the recipient at all; and (4) connecting any subset of the unit's prime telephone jack, its answering machine Jack, its FAX machine jack, its secondary extension Jack to the telephone line after identification of the caller is complete.

If the current display is an entry from the call log or the quick dial list 820, then the directory entry referred to by the log or quick dial pointer is displayed at 822. If any other information is on the screen when the "More" command is given, a static menu is displayed with a short explanation of the possible commands available in the system at 824.

If at 830 the command character is the left arrow key, the response again depends on the current display. If at 832 the current display is the first sheet in a disposition calendar, then the directory entry which uses it is displayed at 834. If at 836 the current display is a subsequent sheet in a disposition calendar, then the previous sheet is displayed at 838. If at 812 the current display is a directory entry, the next display depends upon a further internal variable which notes what kind of command preceded the most recent sequence of arrow commands. For example, if at 842 the sequence began with a log entry, then the log entry is redisplayed at 696. If at 844 the sequence began with a quick dial pointer, then the quick dial pointer is redisplayed at 714. In any other case the display does not change.

Referring now to FIG. 6A-5, if at 850 the command character is the up or down arrow key, the response again depends on what kind of command preceded the most recent sequence of arrow commands. For example, if at 852 the sequence began with a menu display, then the menu is scrolled appropriately up or down one line at 854. If at 812 the sequence began with a directory entry, then the appropriate next or previous entry in the directory is displayed at 854. If at 856 the sequence began with a log entry, then the next later (down) or next earlier (up) log entry is displayed at 858. If at 860 the sequence began with display of the unrestricted prefix list, then the list is scrolled appropriately up or down one line at 862. Any other display is unchanged by the up and down arrows.

If at 870 the command character is the "Quick Dial" key, then the dial number routine 606b is invoked without changing the contents of the buffer containing the number to be dialed. This allows the "Quick Dial" key to double as a quick dial pointer selector when a number is given, and as an instant redial key when no number is given.

Figure 6B:
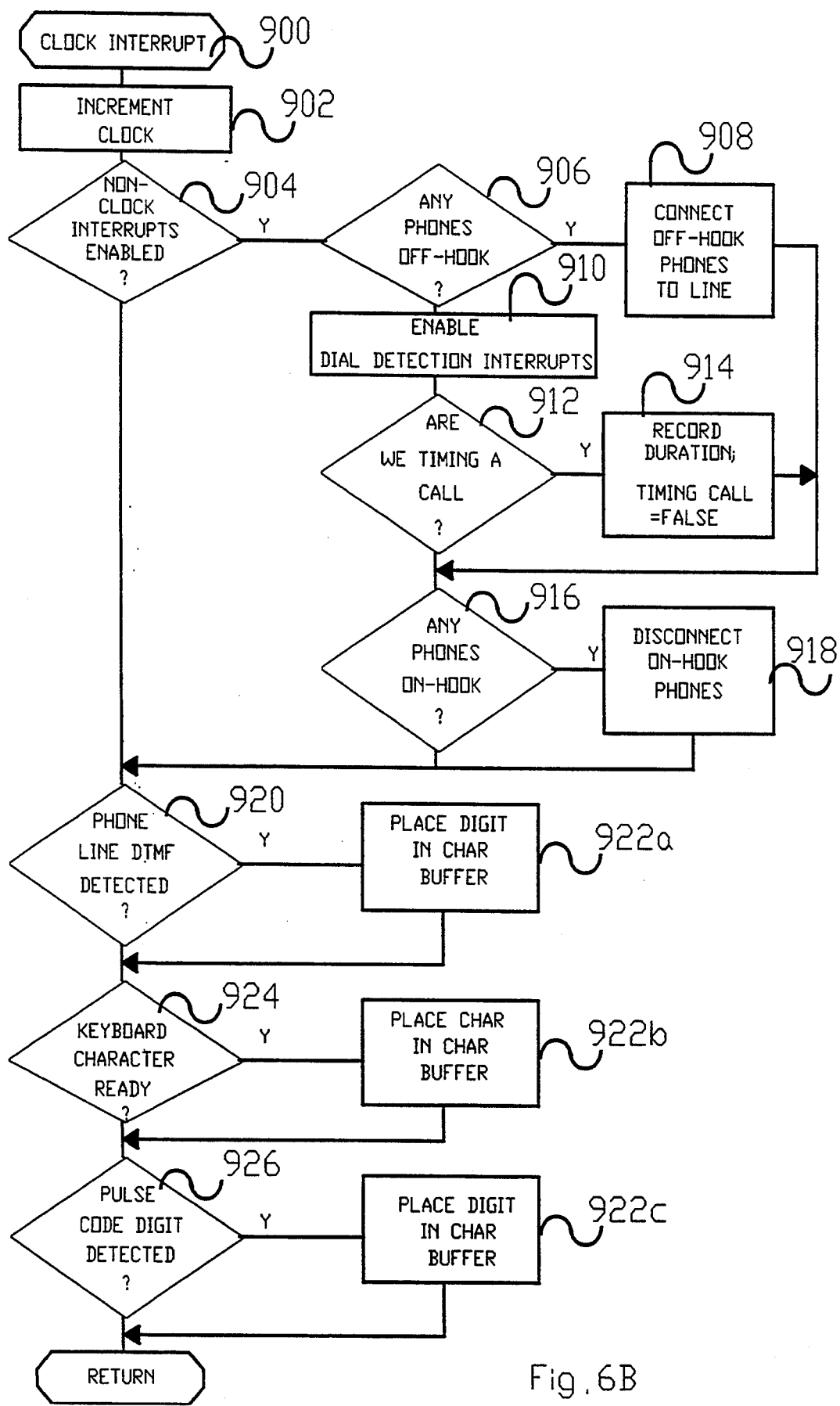

FIG. 6B is a flowchart of the clock process of the present invention. At regular intervals controlled by a hardware timer which may be internal to microprocessor 400, an interrupt is generated which causes the clock process to start at 900. The program first increments the internal clock at 902, which is preferably a RAM buffer containing the system date and time. If at 904 non-clock interrupts are also enabled, then any phones connected to the back-panel jacks 204 will be under automatic control, and must be checked. If at 906 any phone (including any uncontrolled extension) is in an off-hook condition, then a command is issued to connect system-controlled off-hook phone(s) to the line at 908. Otherwise, the dial detect interrupt is enabled at 910, and an internal variable is checked to see if a call in progress was being timed at 912. If so, that call is now finished, so the duration of the call is entered in the log entry at 306 for that call, and the internal variable is set to indicate that no call is being timed at 914. Next, all system-controlled phones are checked for on-hook status at 916, and those which are on-hook are disconnected from the phone line at 918.

All further processing by the clock process occurs regardless of the status of non-clock interrupts. If at 920 a DTMF digit has been detected on the phone line, then it is placed in the character buffer for use by the other processes at 922a. Similarly, if at 924 a keyboard character is ready, or at 926 a pulse coded digit is detected on the phone line, the information is placed in the character buffers 922b, 922c for use by the other processes. The character buffers 922a–c are collectively a queue for containing the input characters or digits, and an indication of their sources.

Figures 1, 6C:
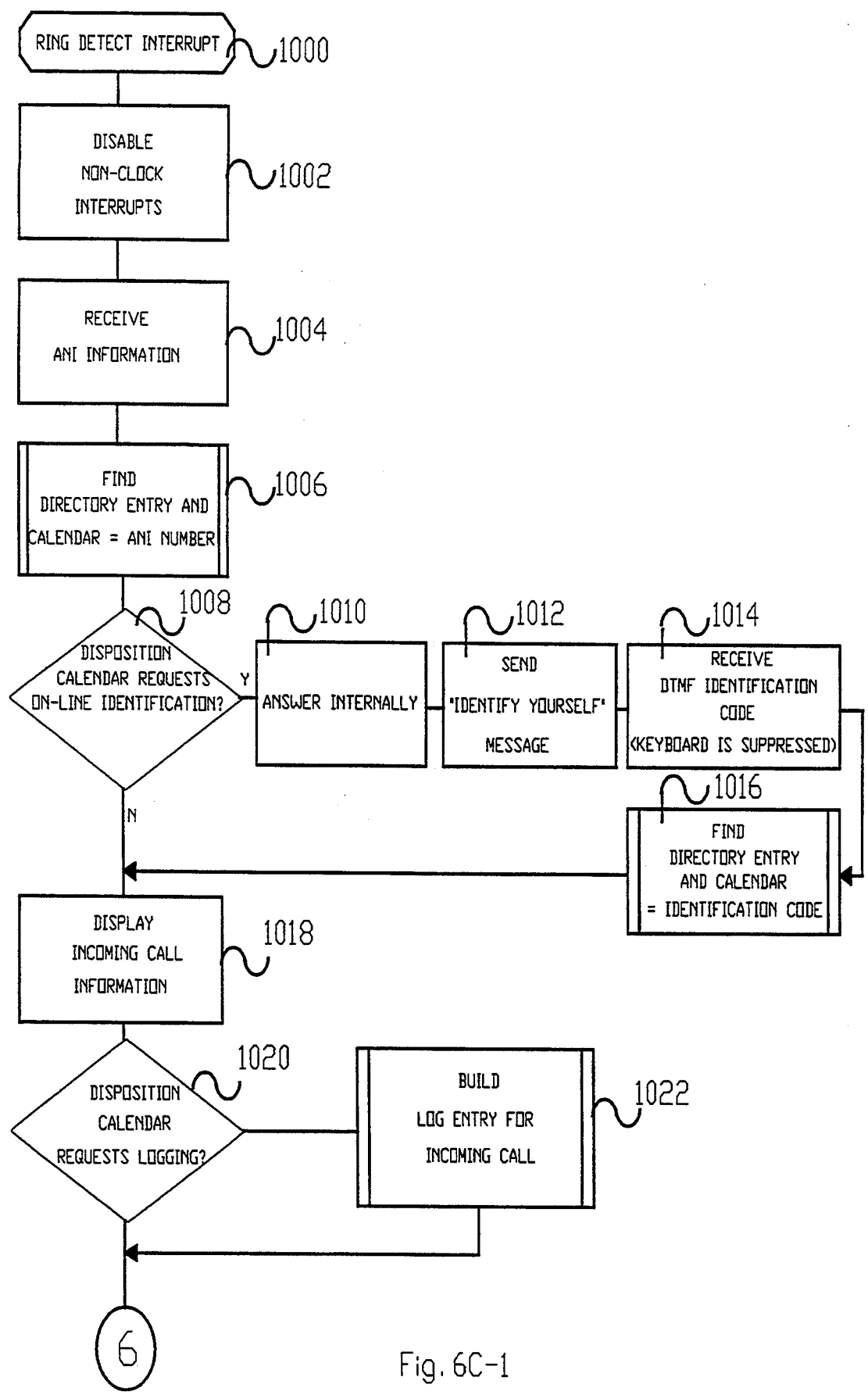
Figures 2, 6C:
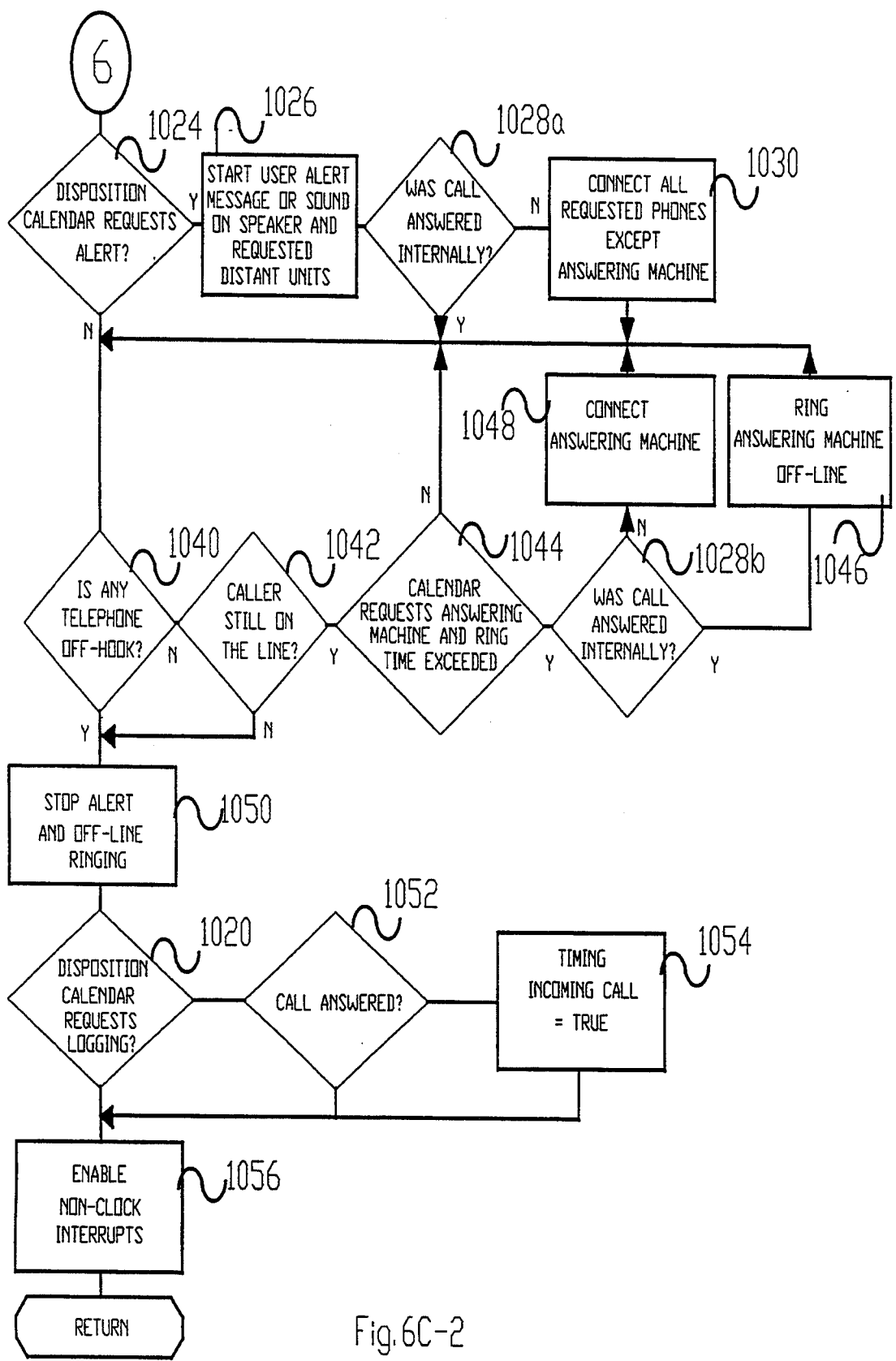
FIG. 2 is a top view of a control and display console for a preferred embodiment of the system of FIG. 1.

FIG. 6C is a flowchart of the incoming call routing process of the present invention. When the ring detection circuit 508 (FIG. 5A), detects a power ringing cycle on the phone line 104, a hardware interrupt is generated at 1000 which takes control if it is not disabled. This routine immediately disables both its own and the outgoing call interrupt at 1002, thus ensuring that it has full control over both the phone line 104 and the controlled phones. During the first long pause in the power ringing cycle, the routine attempts to receive ANI information at 1004 from the ANI detector 106 (FIG. 4).

At 1006 the ANI information is used to find the appropriate directory entry and the ANI information time. Alternatively, if ANI information was not received, the system time is used to determine which sheet in the associated dispositions calendar applies to the incoming call at 1006. The appropriate sheet is the first sheet applicable to the day of the week and time of day of the incoming call. The last sheet of every disposition calendar is always set to include every day and all hours.

If at 1008 the applicable sheet of the disposition calendar specifies that the caller must be further identified, the routine will answer the call internally by connecting the telephone network circuit 422 to the phone line at 1010. The routine also sends the voice message telling the caller to enter an identification code, and a tone signal indicating when the code should be entered at 1012. Since the tone signal can also be automatically detected, it may serve a second purpose by informing a sister system dialing a number from its directory that the time has come to dial the outgoing special code. This means that the user of the invention can store complete dialing sequences, including outgoing codes, in the directory for automatic dialing. The routine receives the identification code as DTMF digits, during which input from any other source found in the character buffer is ignored at 1014. Also, the routine finds the directory entry and associated calendar sheet for the identification code at 1016.

When identification is complete, the result is displayed on the system display, and the number and/or identification code detected is put in the add buffer for possible later use at 1018. This allows users who have ANI service to accumulate directory entries with a minimum of key input. Further processing is determined from the instructions in the calendar sheet thus found. If the calendar requires logging the incoming call at 1020, then a call log entry is built at 1022.

Referring now to FIG. 6C-2, if at 1024 the calendar requires alerting the recipient, then the alert is initiated at 1026. The alert includes a local alert (i.e., recipient local alert 312 of FIG. 3) and a distant alert (i.e. distant alert unit 310 of FIG. 3). The local alert consists either of a speech message such as "Priority X caller is . . . " followed by the directory name accessed, spelled out in letters, or a set of generated tones typical of a ringing electronic telephone, where the set of tones is characteristic of the priority of the caller. In a preferred implementation, at least seven priority levels are available. The local alert 312 sound is produced at the system speaker 208. The distant alert consists of the same sounds as the local alert, but the sounds are transmitted through the distant extension alert generator 308 to the appropriate distant alert units 310, where they are reconstituted and produced at the distant alert unit speakers.

In a preferred implementation, the distant extension alert module is capable of at least 7 different carrier bands, and each distant alert unit can be configured by a set of hand-operated switches to respond to any particular band. Thus, different distant alert units may be activated for different callers, allowing, for example, a resident teenager to be notified of her calls separately, without fraying the nerves of other residents, such as the exasperated parents of the teenager. In this respect, the invention mimics to a certain degree a PBX. The type of alert, voice or pure sound, and the priority and distant alert set, are parameters on each calendar sheet. If, for an alert, the call was not answered internally at 1028a, all requested phones plugged into the invention are connected to the telephone line at 1030, except that which is designated an "answering machine".

Whether or not an alert has been requested, the process then enters a loop which is exited when either: (1) a recipient phone goes off-hook at 1040; or (2) the caller leaves the line without completing the call at 1042. The process measures the time since the incoming call was received. If the calendar requests that the call be connected to the answering machine after a certain time interval, and that interval has elapsed at 1044, answering machine special processing is initiated at 1048.

If at 1028 the call was answered internally for identification by code, then the answering machine is awakened by the off-line ring generation at 1046 while still disconnected from the telephone line 104. This allows even code-identified callers to be shunted to an answering machine without alerting a recipient, if so desired. Otherwise, if the call is still producing power ringing, the answering machine is connected to the telephone line 104, which will awaken it in the normal manner at 1048. Upon exit of this loop, the call has either been answered, or the caller has given up. Both off-line ring generation and alert are terminated whether or not they were active at 1050.

If at 1020 the calendar requires a log, then the internal variable which indicates to the clock process that a call is being timed is set at 1054 when and if the call has been answered at 1052. Finally, at 1056 non-clock interrupts are enabled, returning control of the various local telephones to the clock process.

Figure 6D:
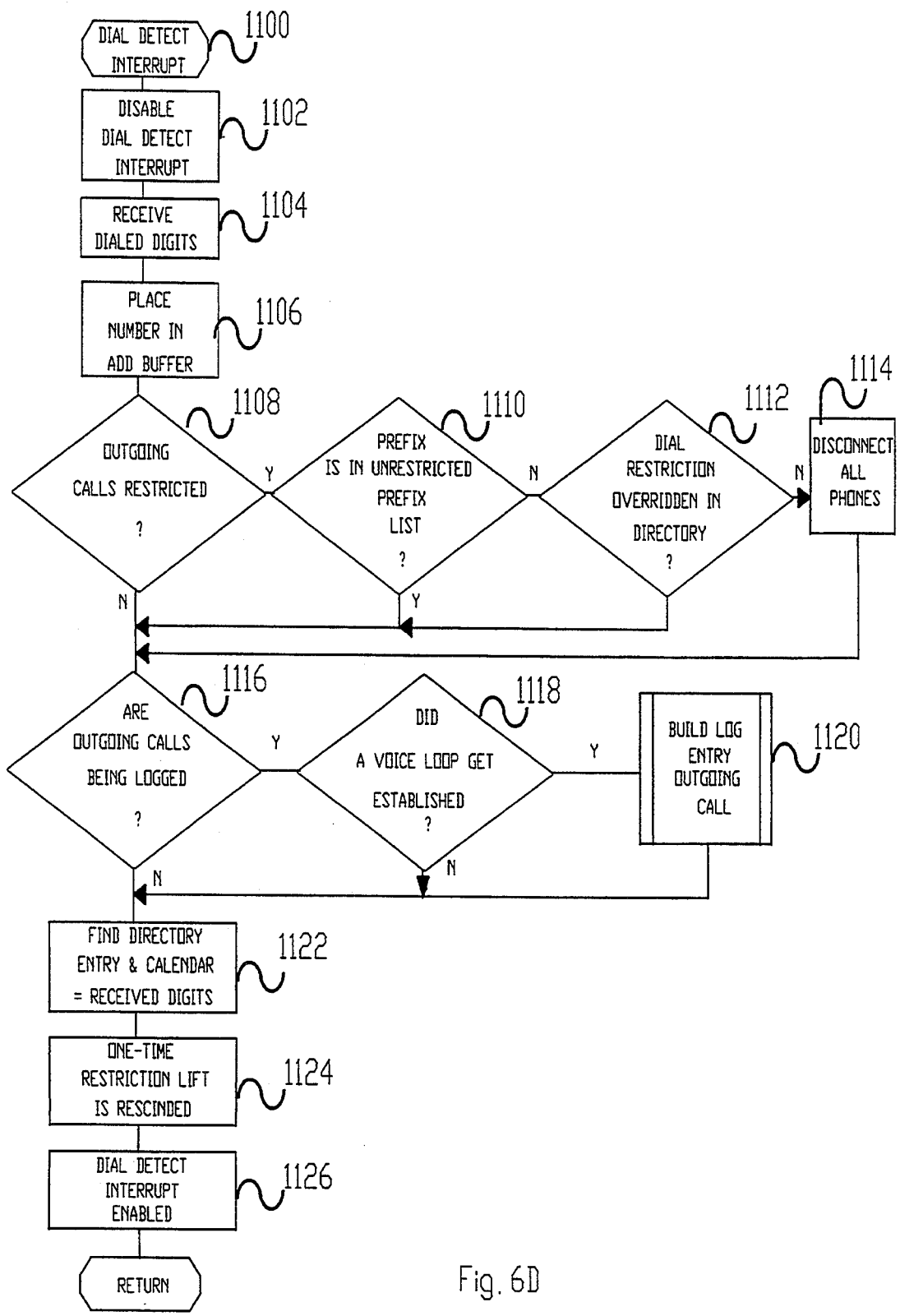

FIG. 6D is a flowchart of the outgoing call process. When the line monitor sensors 416 detect either a DTMF or a pulse coded digit, they generate an interrupt at 1100 to the microprocessor 400. The invoked process immediately disables the dial detect interrupt at 1102. The process then passively receives the interrupting digit and further dialing digits at 1104, which are also placed in an add buffer for possible later use by the command processor at 1106.

If at 1108 outgoing calls are restricted and a one-time release is not in effect, then the call is checked for acceptability. If the prefix of the number dialed is in the list of unrestricted prefixes, the call is allowed at 1110. Otherwise, if the number dialed is in the directory, and the directory entry has the dial restriction override set, then the call is allowed at 1112. This lets the user declare certain numbers to be freely dialable, even when their associated prefixes are not freely dialable. This is a capability which mirrors services available from some telephone companies which allow a lump sum payment to cover unlimited calls to a particular number which is normally a toll call. If neither test above permits the call, then the invention attempts to block the call by disconnecting all phones under its control from the telephone line at 1114.

If at 1116 outgoing calls are being logged, and a voice loop was established at 1118, then a log entry is built for the outgoing call at 1120. The decision whether a voice loop was established is, with the current state of the art, an approximate one, since call progress tones and error messages produced by the phone companies sometimes require human intelligence to differentiate from answered calls. The system assumes the call was answered any time it is unable to make a clear decision to the contrary.

The directory is then searched for the dialed number, and the results displayed on the system display at 1122. The internal variable indicating a one-time release from calling restrictions is turned off at 1124. This re-establishes the full level of requested dialing restriction for subsequent calls for any event. Also, this enables the dial detect interrupt at 1126, such that the process relinquishes control to the command processor and clock.

Although specific features of the invention have been shown in some drawings and not others, this is done for convenience and clarity of representation only, as the various features may be combined with any or all other features in accordance with the invention.

It should be understood that various modifications within the scope of this invention can be made by one of ordinary skill in the art without departing from the spirit thereof. For example, the call log 306 may be searched by telephone number, code, or name as well as date/time, so that all calls from a particular party may be reviewed. Also, supplementation of databases may include time offsets used to calculate and display the current time at a calling or called party's location. Further, specialized, non-standard jacks may be supplied so that connected equipment cannot be simply disconnected from the unit and reconnected to the telephone company's jack, thereby thwarting outgoing dialing restrictions. Further still, additional external communication protocol may be added to allow incoming identification to be performed, and dispositions to be decided by the external device, and have the resulting dispositions be carried out by the invention. Also, special prefixes, such as long-distance access codes and ANI suppression codes which prevent the caller's number from being delivered to the called telephone, may be added to the databases for further automation of dialing. Finally, an alternate hardware solution for the distant extension alert system might use low-power radio broadcasting, such as is found in home intercom systems, rather than power wiring broadcast.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. In combination with an analog non ISDN telephone line having a first, on-hook state and a second, off-hook state, and wherein voice transmission occurs only while in the off-hook state, an automatic incoming telephone call identification and disposition system comprising in operative combination:
   a) a database containing a directory of telephone numbers and telephone number disposition calendars wherein:
      i) each telephone number entered in said database has an identifying code and a name associated therewith:
      i) said telephone number disposition calendars contain information relating to one or more of a plurality of caller response options, each of which is individually selectable according to respective preselected access times and dates assigned to each of said telephone numbers;
   b) line voltage monitoring means for monitoring line voltage on an analog telephone line connected to said system, said voltage monitoring means including:
      i) means for detecting when a threshold line voltage is exceeded in order to determine whether said analog telephone line is in an on-hook state or an off-hook state;
      ii) means for detecting a particular voltage fluctuation when said analog telephone line is in said on-hook state, said particular voltage fluctuation corresponding to a ring signal associated with an incoming telephone call
   c) means for identifying the telephone number of said incoming call during said on-hook state of said analog telephone line;
   d) means for requesting and detecting a code associated with said incoming call during an off-hook state of said analog telephone line:
   e) system control means including a clock operative to assign a time and date stamp for each incoming call, compare at least one of the number and code of detected incoming calls to the telephone numbers and to disposition calendar information stored in said database, and execute an appropriate caller response option according to preselected disposition calendar information assigned to each telephone number;
   f) means for displaying the entries of said directory;
   g) user interface means operative to permit the addition, deletion or modification of telephone number and disposition calendar information contained in said database; and
   h) means for audibly alerting call recipients of an incoming call.

2. An automatic incoming telephone call identification and disposition system as in claim 1 wherein said caller response options of said disposition calendars to an incoming call include:

a) means for identifying a caller on said display means after putting said incoming call in said off-hook state and requesting and detecting the identifying code associated with telephone number of said caller;
b) means for selectively alerting a call recipient via said audible alert means;
c) means for connecting the incoming call to a fax machine; and
d) means for connecting the incoming call to an answering machine.

3. An automatic incoming telephone call identification and disposition system as in claim i which includes:
a) means for maintaining and displaying a log of telephone numbers wherein each of said telephone numbers is associated with an incoming or outgoing call.

4. An automatic incoming telephone call identification and disposition system as in claim 1 which includes a handset and means for dialing outgoing calls.

5. An automatic incoming telephone call identification and disposition system as in claim 4 which further includes:
a) means for detecting a busy signal on an outgoing call; and
b) means for redialing a number for said outgoing call until said busy signal is no longer detected.

6. An automatic incoming telephone call identification and disposition system as in claim 4 which further includes means for restricting dialing of outgoing calls to a limited quantity of area codes and prefixes.

7. An automatic incoming telephone call identification and disposition system as in claim 6 which further includes means for suspending said outgoing call dialing restricting means according to one of a plurality of user specified preconditions, wherein said user specified preconditions include whether a specified time interval has elapsed and whether a number associated with a particular outgoing call has been pre-specified as being a number which is freely dialable.

8. An automatic incoming telephone call identification and disposition system as in claim 4 which further includes means for automatically redialing the most recently dialed number.

9. An automatic incoming telephone call identification and disposition system as in claim 3 which further includes means for retrieving and automatically dialing a telephone number stored in said database directory or said log of telephone numbers.

10. An automatic incoming telephone call identification and disposition system as in claim 9 which further includes means for data communication of caller identification information and disposition calendar information to a second automatic incoming telephone call identification and disposition system in response to a request therefrom once an off-hook connection with said second automatic incoming telephone call identification and disposition system has been established.

11. An automatic incoming telephone call identification and disposition system as in claim 4 which further includes:
a) means for automatically dialing complete telephone numbers from a table of abbreviated numbers; and
b) means for adding to, deleting from, and changing the entries in said table of abbreviated numbers.

12. An automatic incoming telephone call identification and disposition system as in claim 2 which includes means for overriding a preselected disposition calendar caller response option and substituting therefor a different caller response option for a requested period of time.

13. An automatic incoming telephone call identification and disposition system as in claim 1 wherein said call recipient alert means includes means for ringing one or more extension telephones connected to said system.

14. An automatic incoming telephone call identification and disposition system as in claim 1 which further includes means for generating a plurality of multiple, mutually distinguishable alert signals to audibly convey information concerning the identification of a caller.

15. An automatic incoming telephone call identification and disposition system as in claim 1 wherein:
a) said system is contained within a console;
b) said display means is an LCD screen display disposed on said console;
c) said user interface means includes an alphanumeric keyboard disposed on said console; and
d) call recipient audible alert means includes a speaker disposed on said console.
e) remote alert means for ringing one or more extension phones connected to said system.

16. An automatic incoming telephone call identification and disposition system as in claim 15 which includes;
a) means for announcing all information displayed on said LCD display in human voice form on said speaker.

17. An automatic incoming telephone call identification and disposition system as in claim 1 which includes overwrite protect means for preventing unauthorized changes to said database and said system control means.

18. An automatic incoming telephone call identification and disposition system as in claim 1 which includes digital means for transmission of configurable system data and data concerning individual telephone calls to and from connected external devices, allowing said configurable system data and data concerning individual telephone calls to be saved and externally processed.

19. An automatic incoming telephone call identification and disposition system comprising in operative combination:
a) a database containing a directory of telephone numbers and telephone number disposition calendars wherein:
i) each telephone number entered in said database has an identifying code and a name associated therewith;
ii) said telephone number disposition calendars contain information relating to one or more of a plurality of caller response options, each of which are individually selectable according to preselected access times and dates assigned to each of said telephone numbers;
b) means for monitoring a telephone line connected to said system to detect an incoming telephone call;
c) means for identifying the telephone number of the line of said incoming call;
d) means for requesting and detecting a code associated with said incoming call;
e) system control means including a clock operative to assign a time and date stamp for each incoming call, compare at least one of the number and code of detected incoming calls to the telephone numbers and to disposition calendar information stored in said database, and execute an appropriate caller response option according to preselected disposition calendar information assigned to each telephone number;

f) means for displaying the entries of said directory;

g) user interface means operative to permit the addition, deletion or modification of telephone number and disposition calendar information contained in said database;

h) means for audibly alerting call recipients of an incoming call; and j) digital means for transmission of configurable system data and data concerning individual telephone calls to and from connected external devices, allowing said configurable system data and data concerning individual telephone calls to be saved and externally processed.

* * * * *